(12) United States Patent
Vassberg et al.

(10) Patent No.: US 11,982,191 B2
(45) Date of Patent: May 14, 2024

(54) SUBSONIC TURBOFAN ENGINES WITH VARIABLE OUTER GUIDE VANES AND ASSOCIATED METHODS

(71) Applicant: The Boeing Company, Chicago, IL (US)

(72) Inventors: John Charles Vassberg, Long Beach, CA (US); David T. Yeh, Irvine, CA (US); Dino Roman, Lake Forest, CA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/827,297

(22) Filed: May 27, 2022

(65) Prior Publication Data

US 2022/0389830 A1 Dec. 8, 2022

Related U.S. Application Data

(60) Provisional application No. 63/197,211, filed on Jun. 4, 2021.

(51) Int. Cl.
*F01D 17/16* (2006.01)
*F01D 9/04* (2006.01)
*F02K 3/06* (2006.01)

(52) U.S. Cl.
CPC .......... *F01D 17/162* (2013.01); *F01D 9/041* (2013.01); *F02K 3/06* (2013.01); *F05D 2220/323* (2013.01); *F05D 2240/12* (2013.01); *F05D 2260/4031* (2013.01); *F05D 2260/606* (2013.01)

(58) Field of Classification Search
CPC . F01D 17/162; F05D 2240/12; F05D 2250/90
See application file for complete search history.

(56) References Cited

U.S. PATENT DOCUMENTS

| | | | | |
|---|---|---|---|---|
| 3,861,822 A | * | 1/1975 | Wanger | F04D 29/563 415/162 |
| 4,080,785 A | * | 3/1978 | Koff | F02K 3/077 60/226.3 |
| 5,259,187 A | * | 11/1993 | Dunbar | F02K 3/06 60/226.3 |
| 5,794,432 A | * | 8/1998 | Dunbar | F02K 1/16 60/226.1 |

(Continued)

*Primary Examiner* — Brian Christopher Delrue
(74) *Attorney, Agent, or Firm* — Kolitch Romano Dascenzo Gates LLC

(57) ABSTRACT

Subsonic turbofan engines with variable outer guide vanes (OGVs) and associated methods. A subsonic turbofan engine includes an engine core configured to generate a torque, a fan configured to accelerate an air flow, an engine nacelle, and a plurality of OGVs positioned downstream of the fan. Each OGV is configured to transition among a plurality of OGV configurations defined between and including a nominal configuration and a reduced-drag configuration. The subsonic turbofan engine is configured to operate only at subsonic speeds. In examples, methods of operating a subsonic turbofan engine include transitioning each of a plurality of OGVs from a nominal configuration to a reduced-drag configuration. Transitioning each OGV from the nominal configuration to the reduced-drag configuration is performed while the subsonic engine operates at subsonic speeds.

47 Claims, 7 Drawing Sheets

(56) References Cited

U.S. PATENT DOCUMENTS

| | | |
|---|---|---|
| 7,730,714 B2 | 6/2010 | Wood et al. |
| 10,815,802 B2 * | 10/2020 | Prasad .................... F01D 9/041 |
| 10,954,805 B2 | 3/2021 | Vassberg et al. |
| 2007/0119150 A1 * | 5/2007 | Wood ...................... F02C 7/042 |
| | | 60/226.1 |
| 2009/0097967 A1 * | 4/2009 | Smith ................... F04D 29/563 |
| | | 415/1 |
| 2011/0167792 A1 * | 7/2011 | Johnson ................ F01D 17/162 |
| | | 60/226.3 |
| 2016/0069275 A1 * | 3/2016 | Lecordix .................. F02C 9/22 |
| | | 415/146 |
| 2016/0376918 A1 * | 12/2016 | Swann ...................... F02C 3/04 |
| | | 60/772 |

* cited by examiner

SUBSONIC TURBOFAN ENGINES WITH VARIABLE OUTER GUIDE VANES AND ASSOCIATED METHODS

RELATED APPLICATION

The present application is a non-provisional of and claims priority to U.S. Provisional Patent Application No. 63/197,211, filed on Jun. 4, 2021, entitled "SUBSONIC TURBOFAN ENGINES WITH VARIABLE OUTER GUIDE VANES AND ASSOCIATED METHODS," the complete disclosure of which is incorporated by reference.

FIELD

The present disclosure relates to subsonic turbofan engines with variable outer guide vanes and associated methods.

BACKGROUND

With increasing demand for high-efficiency, low-noise aircraft engines for civilian and commercial aircraft, aircraft engine design correspondingly is trending toward turbofan engines with increasingly high bypass ratios. Although high-bypass turbofan engine designs yield fuel-efficiency and acoustic benefits, the physical size of such engines also may introduce engineering challenges. For example, with respect to the design of a turbofan engine for a twin-engine aircraft, regulations require that the engine be sized such that the engine is capable of providing sufficient thrust for safe flight and landing in the event that the remaining engine becomes inoperative in any of a variety of flight conditions. For example, in prior turbofan engine designs, limiting regulatory constraints on turbofan engine designs included the requirements that an aircraft be able to accelerate to take-off speed in a standard length of runway and/or to climb to a safe cruising altitude under the power of a single engine. However, as turbofan engines increase in diameter, and as twin-turbofan-engine aircraft increasingly are utilized for trans-oceanic flights, the detrimental effect of the aerodynamic drag imposed by an inoperative engine upon the range of the aircraft becomes a limiting factor. In particular, in order to satisfy Extended-range Twin-engine Operations Performance Standards (ETOPS) requirements, a single operative engine must provide sufficient thrust to overcome the drag force produced by the inoperative engine and to convey the aircraft between distant landing sites. Thus, there exists a need for subsonic turbofan engines with variable outer guide vanes and associated methods.

SUMMARY

Subsonic turbofan engines with variable outer guide vanes (OGVs) and associated methods are disclosed herein. A subsonic turbofan engine includes an engine core with a core structure configured to generate a torque, a fan with a plurality of fan blades configured to revolve about an engine longitudinal axis of the subsonic turbofan engine to accelerate an air flow, an engine nacelle circumferentially enclosing the fan, and a plurality of OGVs positioned downstream of the fan. The fan is configured to propel the air flow through the subsonic turbofan engine in a downstream direction that is parallel to the engine longitudinal axis. The fan is operatively coupled to the engine core such that the fan is configured to receive the torque from the core structure to revolve the plurality of fan blades. The engine core includes an inner barrel at least substantially enclosing the core structure, and the engine nacelle includes an outer barrel circumferentially enclosing at least a portion of the engine core. Each respective OGV of the plurality of OGVs is configured to transition among a plurality of OGV configurations defined between and including a nominal configuration, in which the respective OGV is oriented to reduce a swirl in the air flow downstream of the fan, and a reduced-drag configuration, in which at least a portion of the respective OGV is increasingly aligned with the downstream direction relative to the nominal configuration. The subsonic turbofan engine is configured to operate only at subsonic speeds.

Methods of operating a subsonic turbofan engine include methods in which the subsonic turbofan engine includes a fan configured to rotate about an engine longitudinal axis to accelerate an air flow to propel the air flow through the subsonic turbofan engine in a downstream direction and a plurality of OGVs positioned downstream of the fan. In some examples, such methods include transitioning each OGV of the plurality of OGVs from a nominal configuration, in which the respective OGV is oriented to reduce a swirl in the air flow downstream of the fan, to a reduced-drag configuration, in which at least a portion of the respective OGV is increasingly aligned with the downstream direction relative to the nominal configuration. In such examples, the transitioning each OGV from the nominal configuration to the reduced-drag configuration is performed while the subsonic engine operates at subsonic speeds.

DESCRIPTION

Figure 1:
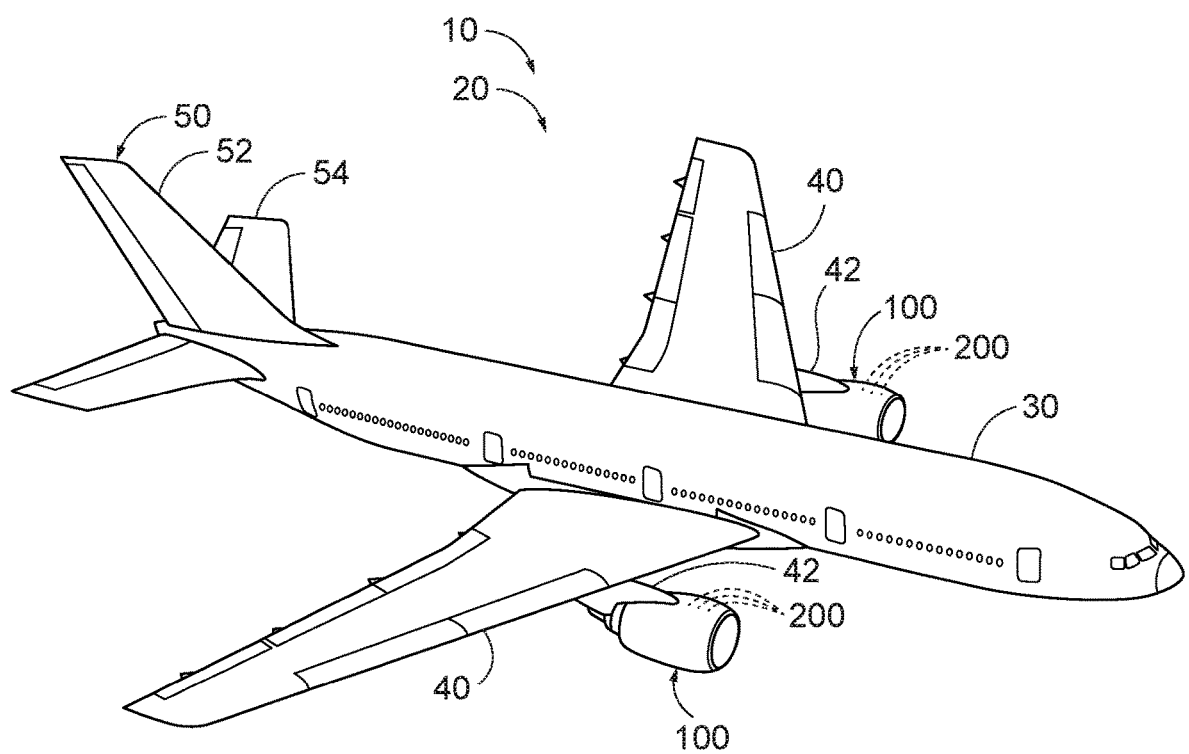
FIG. 1 illustrates an example of a vehicle in the form of an aircraft including examples of subsonic turbofan engines according to the present disclosure.

FIGS. 1-8 provide illustrative, non-exclusive examples of outer guide vanes (OGVs) 200, of subsonic turbofan engines 100 including OGVs 200, of vehicles 10 including subsonic turbofan engines 100, and/or of methods 300 of operating subsonic turbofan engines 100, according to the present disclosure. Elements that serve a similar, or at least substantially similar, purpose are labeled with like numbers in each of FIGS. 1-8, and these elements may not be discussed in detail herein with reference to each of FIGS. 1-8. Similarly, all elements may not be labeled in each of FIGS. 1-8, but reference numerals associated therewith may be utilized herein for consistency. Elements, components, and/or features that are discussed herein with reference to one or more of FIGS. 1-8 may be included in and/or utilized with any of FIGS. 1-8 without departing from the scope of the present disclosure. Generally, in the Figures, elements that are likely to be included in a given example are illustrated in solid lines, while elements that are optional to a given example are illustrated in dashed lines. However, elements that are illustrated in solid lines are not essential to all examples of the present disclosure, and an element shown in solid lines may be omitted from a given example without departing from the scope of the present disclosure. Additionally, in some Figures, one or more components and/or portions thereof that are obscured from view also may be illustrated in dashed lines.

FIG. 1 illustrates an example of a vehicle 10 in the form of an aircraft 20 that may include, utilize, and/or incorporate subsonic turbofan engines 100 according to the present disclosure. In particular, in some examples, and as illustrated in FIG. 1, vehicle 10 and/or aircraft 20 includes a fuselage 30 and one or more wings 40 extending from fuselage 30. In some such examples, each subsonic turbofan engine 100 is operatively coupled to a corresponding wing 40, such as via an engine mount structure 42 such as an engine pylon. However, this is not required of all examples of vehicle 10 and/or of aircraft 20 including subsonic turbofan engine 100, and it additionally is within the scope of the present disclosure that vehicle 10 and/or aircraft 20 may incorporate subsonic turbofan engine 100 at any suitable location thereof. For example, in some examples, and as illustrated in FIG. 1, vehicle 10 and/or aircraft 20 includes a tail assembly 50, such as may include a vertical stabilizer 52 and/or a horizontal stabilizer 54. In some such examples, subsonic turbofan engine 100 is operatively coupled to, and/or is at least partially incorporated into, tail assembly 50, vertical stabilizer 52, and/or horizontal stabilizer 54, such as via engine mount structure 42. Additionally or alternatively, in some examples, subsonic turbofan engine 100 is operatively coupled to, and/or at least partially incorporated into, fuselage 30, such as via engine mount structure 42. Additionally, while the present disclosure generally relates to examples in which subsonic turbofan engine 100 is utilized in conjunction with vehicle 10 in the form of aircraft 20, this is not required of all examples of subsonic turbofan engine 100, and it additionally is within the scope of the present disclosure that vehicle 10 may be any of a variety of vehicles that utilize subsonic turbofan engine 100.

As described herein, vehicle 10 and/or aircraft 20 including subsonic turbofan engine 100 is configured to operate only at subsonic speeds. Stated differently, subsonic turbofan engine 100 as disclosed herein is configured to provide a thrust to propel vehicle 10 and/or aircraft 20 through air at a speed that is less than the speed of sound at the air pressure and temperature at which vehicle 10 and/or aircraft 20 operates. Similarly, in some examples, subsonic turbofan engine 100 itself is configured to operate at subsonic speeds, and/or to operate only at subsonic speeds.

Figure 2:
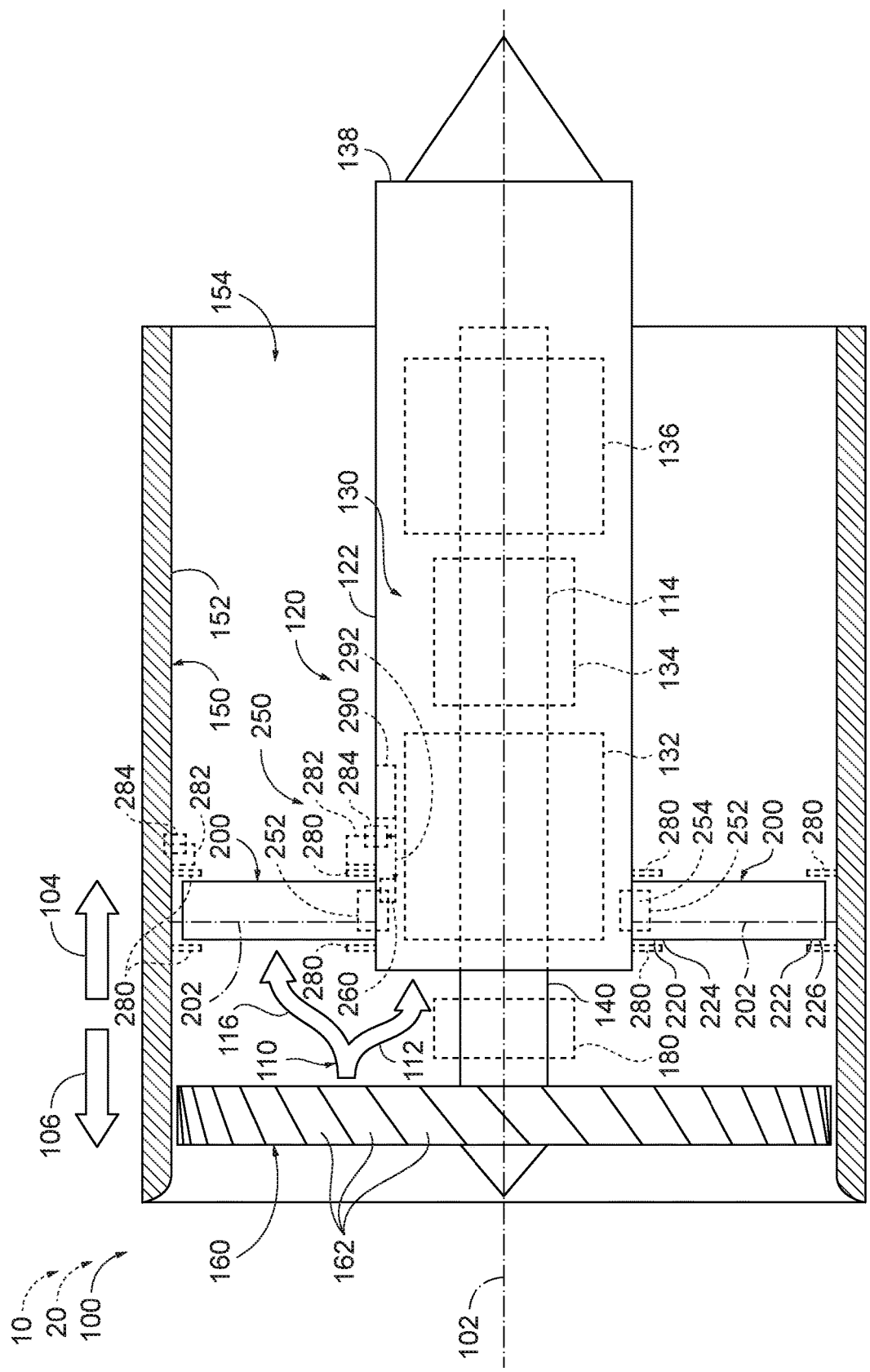
FIG. 2 is a schematic cross-sectional side elevation view representing examples of subsonic turbofan engines according to the present disclosure.
Figure 3:
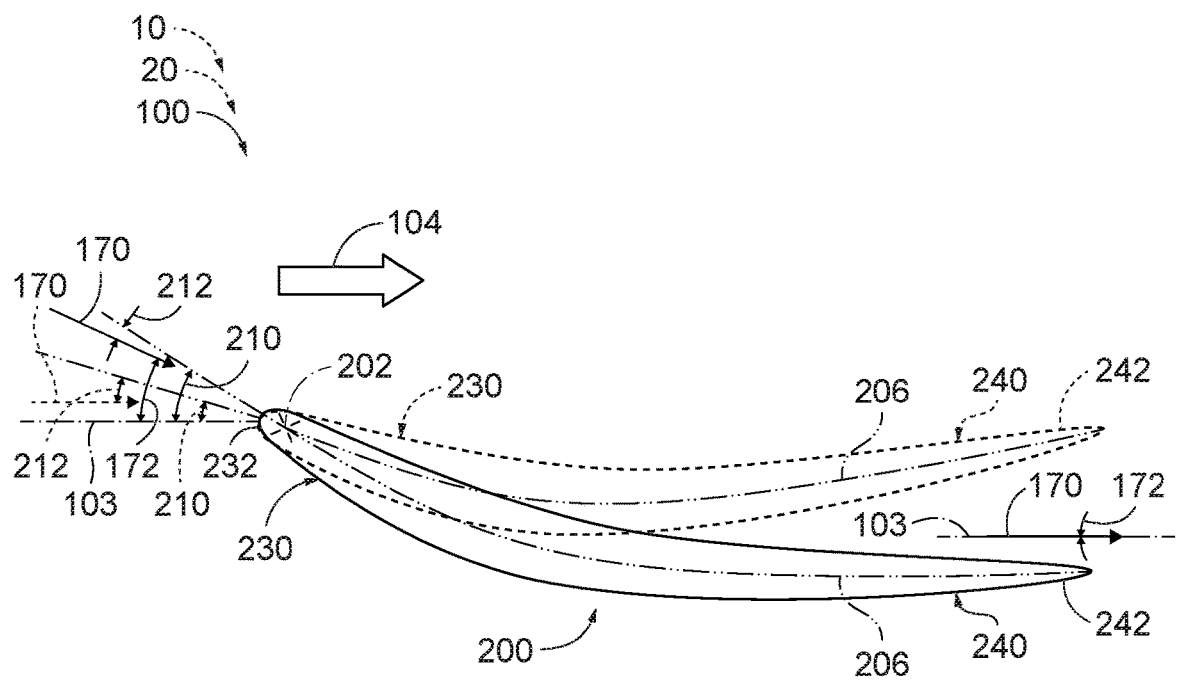
FIG. 3 is a top plan view representing an example of an outer guide vane in a nominal configuration and in a reduced-drag configuration according to the present disclosure.
Figure 4:
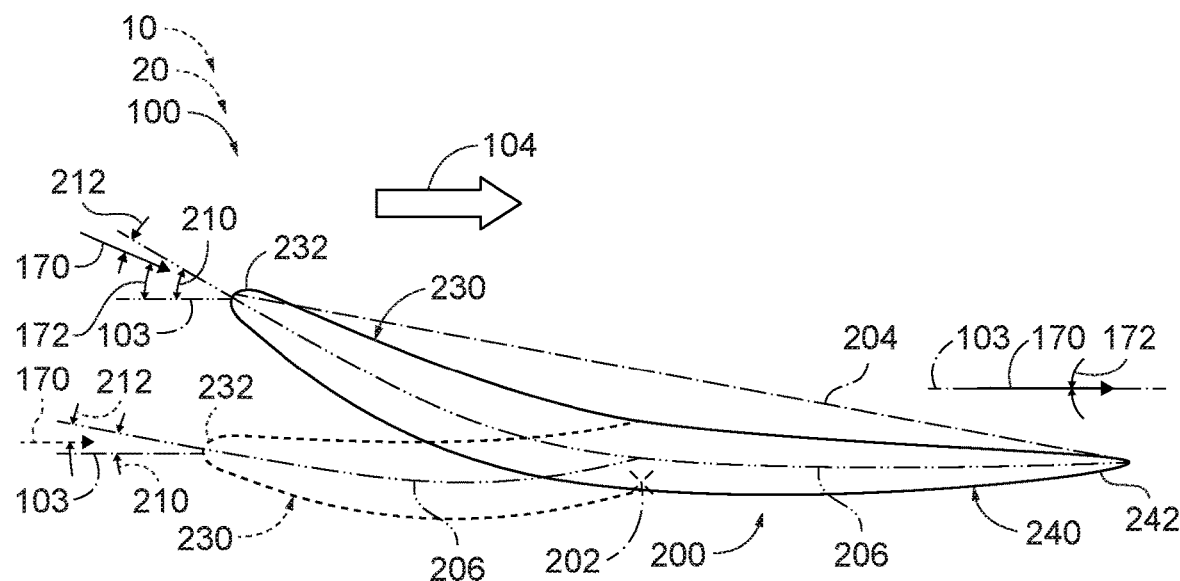
FIG. 4 is a top plan view representing an example of an outer guide vane in a nominal configuration and in a reduced-drag configuration according to the present disclosure.
Figure 5:
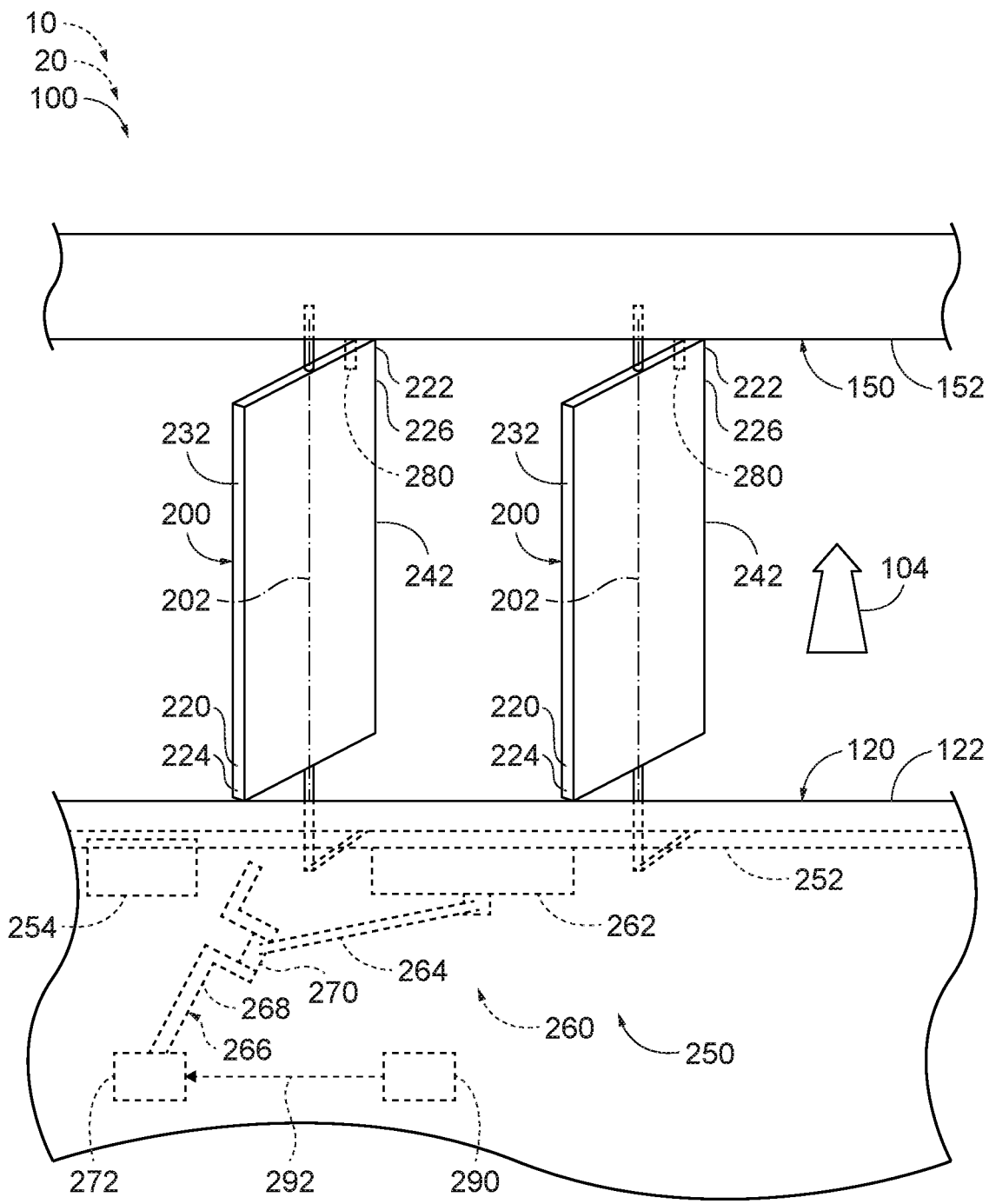
FIG. 5 is a schematic fragmentary front elevation view representing examples of outer guide vanes according to the present disclosure.

FIG. 2 is a schematic cross-sectional side elevation view illustrating examples of subsonic turbofan engines 100, while FIGS. 3-4 schematically illustrate further aspects and/or configurations of OGVs 200. FIG. 5 is a schematic front elevation view illustrating examples of OGVs 200, while FIGS. 6-7 illustrate more specific versions of subsonic turbofan engines 100 and/or of OGVs 200 thereof.

Figure 6:
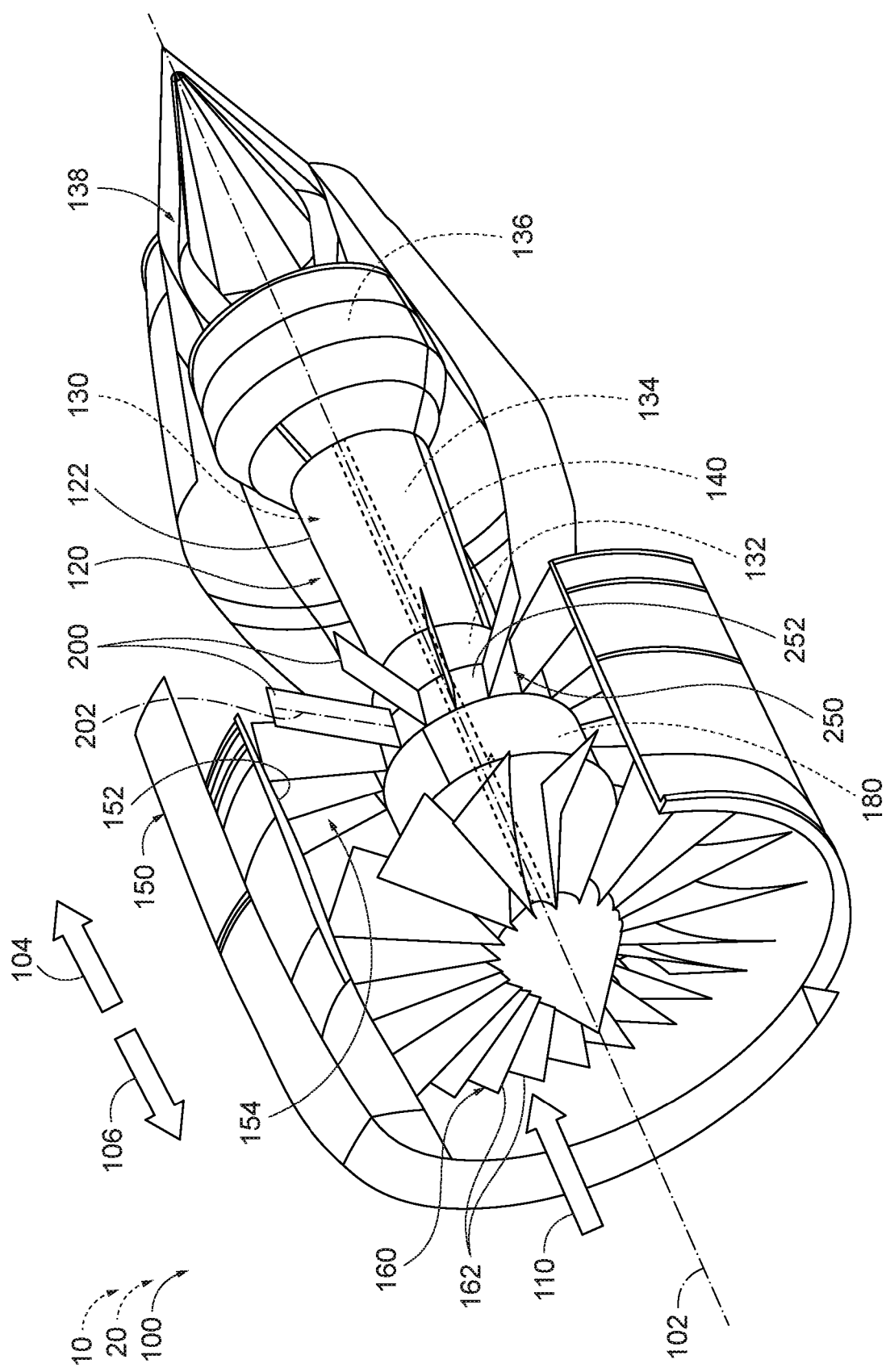
FIG. 6 is a top front side isometric cutaway view representing an example of a subsonic turbofan engine according to the present disclosure.
Figure 7:
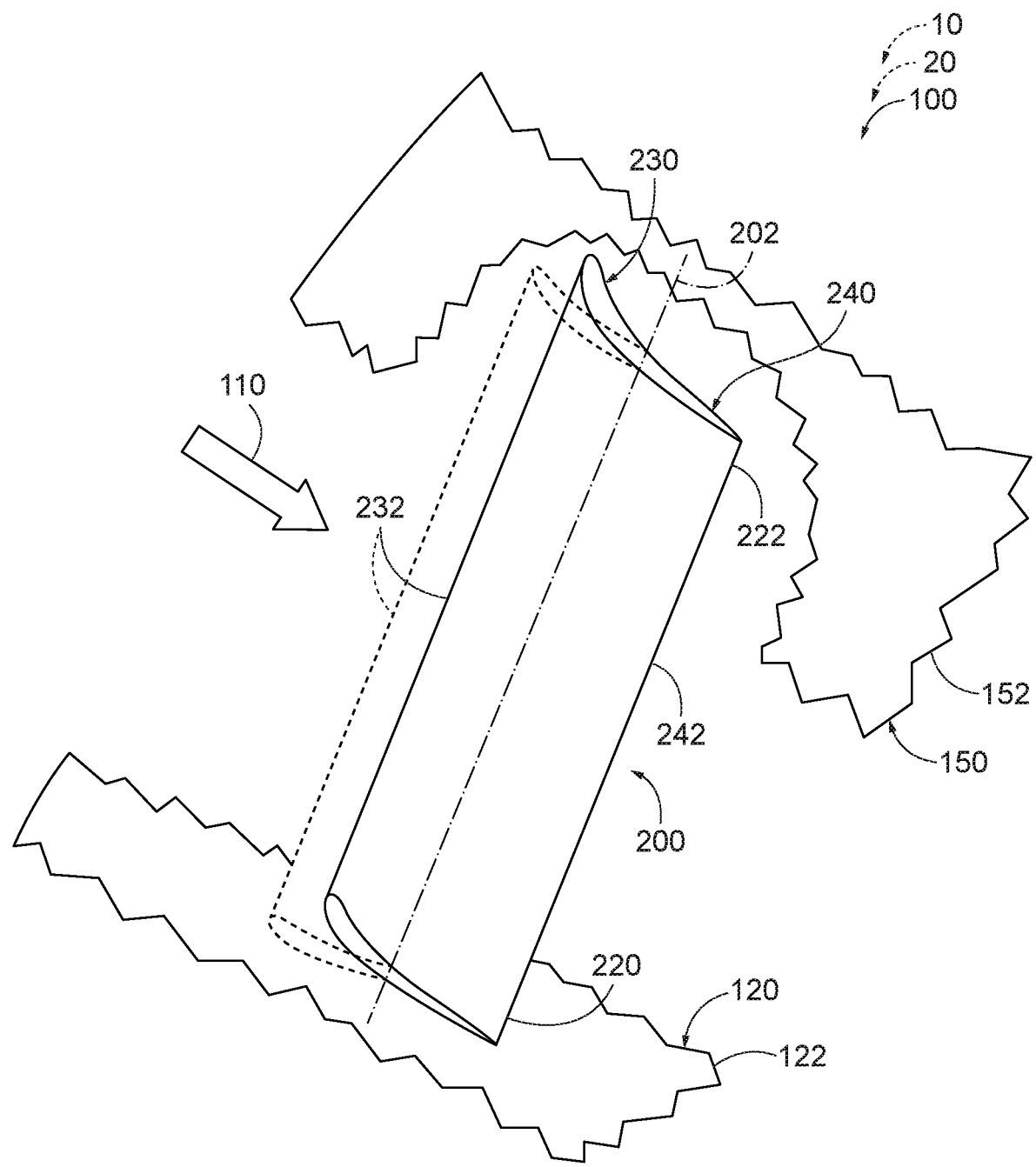
FIG. 7 is a top side isometric cutaway fragmentary view representing an example of an outer guide vane in a nominal configuration and in a reduced-drag configuration according to the present disclosure.

As schematically illustrated in FIG. 2 and less schematically illustrated in FIG. 6, subsonic turbofan engine 100 includes an engine core 120 including a core structure 130 that is configured to generate a torque and an inner barrel 122 at least substantially enclosing core structure 130. Subsonic turbofan engine 100 additionally includes a fan 160 with a plurality of fan blades 162 that are configured to revolve about an engine longitudinal axis 102 of subsonic turbofan engine 100 to accelerate an air flow 110. In this manner, and as schematically illustrated in FIG. 2 and less schematically illustrated in FIG. 6, fan 160 is configured to propel air flow 110 through subsonic turbofan engine 100 in a downstream direction 104 that is parallel to engine longitudinal axis 102. Fan 160 is operatively coupled to engine core 120 such that fan 160 is configured to receive the torque from engine core 120 and/or from core structure 130 to revolve the plurality of fan blades 162. Stated differently, as used herein, the term "operatively coupled," as used to describe a functional and/or structural relationship between engine core 120 and fan 160, is intended to refer to any configuration in which engine core 120 and fan 160 are directly and/or indirectly coupled to one another via one or more structural components, and/or any configuration which engine core 120 and fan 160 are functionally associated with one another such that fan 160 receives the torque from engine core 120 and/or core structure 130 to revolve fan blades 162 about engine longitudinal axis 102. As described herein, a description of fan blades 162 revolving about engine longitudinal axis 102 is equivalent to a description of fan 160 rotating about engine longitudinal axis 102. As additionally schematically illustrated in FIG. 2 and less schematically illustrated in FIG. 6, subsonic turbofan engine 100 includes an engine nacelle 150 circumferentially enclosing fan 160 and including an outer barrel 152 circumferentially enclosing at least a portion of engine core 120.

As schematically illustrated in FIG. 2 and less schematically illustrated in FIG. 6, subsonic turbofan engine 100 further includes a plurality of outer guide vanes (OGVs) 200 positioned downstream of fan 160. In particular, in some examples, and as schematically illustrated in FIG. 2, each OGV 200 extends between inner barrel 122 and outer barrel 152. As described in more detail herein, each OGV 200 is configured to transition among a plurality of OGV configurations defined between and including a nominal configuration and a reduced-drag configuration. In particular, when each respective OGV 200 is in the nominal configuration, the respective OGV 200 is oriented to reduce a swirl in air flow 110 downstream of fan 160. By contrast, when each respective OGV 200 is in the reduced-drag configuration, at least a portion of the respective OGV 200 is increasingly aligned with downstream direction 104 relative to the nominal configuration. Stated differently, when each respective OGV 200 is in the reduced-drag configuration, at least a portion of the respective OGV 200 is increasingly aligned with downstream direction 104 relative to a configuration of the respective OGV 200 and/or portion thereof when the respective OGV 200 is in the nominal configuration. Subsonic turbofan engine 100 may include any suitable quantity of OGVs 200, examples of which include at least 2 OGVs 200, at least 5 OGVs 200, at least 10 OGVs 200, at least 15 OGVs 200, at least 20 OGVs 200, at least 25 OGVs 200, at least 30 OGVs 200, at most 40 OGVs 200, at most 27 OGVs 200, at most 22 OGVs 200, at most 17 OGVs 200, at most 12 OGVs 200, at most 7 OGVs 200, and/or at most 3 OGVs 200.

While the present disclosure generally relates to examples of OGVs 200 that each are configured to transition among the plurality of OGV configurations and to examples of subsonic turbofan engines 100 including such OGVs 200, such examples are not limiting with respect to the scope of the present disclosure. For example, it also is within the scope of the present disclosure that subsonic turbofan engine 100 includes one or more OGVs that are not configured to transition among the plurality of OGV configurations, and/or that are configured to remain at least substantially fixed relative to another component of subsonic turbofan engine 100, such as inner barrel 122 and/or outer barrel 152. In such examples, the one or more OGVs that are not configured to transition among the plurality of OGV configurations may be described as static OGVs and/or as structural OGVs. In such examples, the static and/or structural OGVs may be fixedly coupled to inner barrel 122 and/or outer barrel 152, such as to form a structural load path between inner barrel 122 and outer barrel 152.

As described in more detail herein, the plurality of OGVs 200 generally are configured to redirect air flow 110 downstream of fan 160 to reduce a degree of swirl and/or vorticity in air flow 110, thereby enhancing an aerodynamic stability of air flow 110 downstream of the plurality of OGVs 200 and enhancing a proportion of the energy of air flow 110 that generates thrust. However, in the event that subsonic turbofan engine 100 ceases to generate the thrust as per nominal operation conditions while each OGV 200 is in the nominal configuration, the plurality of OGVs 200 may be oriented in such a manner that the plurality of OGVs 200 introduce aerodynamic inefficiencies, such as flow separation and/or form drag. Accordingly, and as described in more detail herein, subsonic turbofan engine 100 according to the present disclosure is configured such that each OGV 200 transitions among the plurality of OGV configurations in a manner that reduces a drag force exerted upon vehicle 10 by subsonic turbofan engine 100 in the even that subsonic turbofan engine 100 ceases to generate thrust. In this manner, vehicles 10 including subsonic turbofan engines 100 according to the present disclosure may feature extended maximum range, fuel efficiency, etc. in the event that vehicle 10 operates under the thrust of fewer than all subsonic turbofan engines 100 thereof.

As used herein, the term "downstream," as used to describe a position of a first component and/or region relative to a second component and/or region, is intended to refer to a positional offset with respect to a directionality of air flow 110 traveling through subsonic turbofan engine 100 as schematically illustrated in FIG. 2. For example, a description of a first component and/or region as being positioned downstream of a second component and/or region refers to any configuration in which the first component and/or region is spaced apart from the second component and/or region along downstream direction 104, such that the first component and/or region is positioned to the right of the second component and/or region in the schematic view of FIG. 2. Similarly, as used herein, the term "upstream," as used to describe a position of a first component and/or region relative to a second component and/or region, is intended to refer to a positional offset with respect to a directionality of air flow 110 traveling through subsonic turbofan engine 100 as schematically illustrated in FIG. 2. For example, a description of a first component and/or region as being positioned upstream of a second component and/or region refers to any configuration in which the first component and/or region is spaced apart from the second component and/or region along an upstream direction 106 as schematically illustrated in FIG. 2, such that the first component and/or region is positioned to the left of the second component and/or region in the schematic view of FIG. 2. As schematically illustrated in FIG. 2, downstream direction 104 and upstream direction 106 are opposite one another, and each extends parallel to engine longitudinal axis 102.

In some examples, subsonic turbofan engine 100 may be at least partially characterized with reference to a configuration of air flow 110 within subsonic turbofan engine 100. In some examples, and as schematically illustrated in FIG. 2 and less schematically illustrated in FIG. 6, subsonic turbofan engine 100 includes a bypass duct 154 extending radially exterior of inner barrel 122 and radially interior of outer barrel 152. In some such examples, and as schematically illustrated in FIG. 2 and less schematically illustrated in FIG. 6, bypass duct 154 is at least partially defined by inner barrel 122 and/or by outer barrel 152. In such examples, and as schematically illustrated in FIG. 2, subsonic turbofan engine 100 is configured such that, during operative use of subsonic turbofan engine 100, air flow 110 includes an inner air flow 112 that flows through engine core 120 and an outer air flow 116 that flows through bypass duct 154. More specifically, in some such examples, and as schematically illustrated in FIG. 2, air flow 110 is at least substantially undifferentiated at a location upstream of the plurality of OGVs 200, and air flow 110 includes and/or consists of inner air flow 112 and outer air flow 116 at a location downstream of the plurality of OGVs 200.

In some examples, subsonic turbofan engine 100 may be at least partially characterized by a proportion of air flow 110 that traverses subsonic turbofan engine 100 as outer air flow 116. More specifically, in some examples, during operative use of subsonic turbofan engine 100, a time-averaged ratio of a mass of air in outer air flow 116 to a mass of air in inner air flow 112 is at least 5:1, at least 10:1, at least 15:1, at least 20:1, at least 30:1, at least 40:1, at least 50:1, at most 60:1, at most 45:1, at most 35:1, at most 25:1, at most 17:1, at most 12:1, and/or at most 7:1. In such examples, subsonic turbofan engine 100 also may be referred to as a high-bypass turbofan engine 100.

Additionally or alternatively, in some examples, during operative use of subsonic turbofan engine 100, a ratio of a stagnation pressure of air flow 110 proximate to and downstream of OGVs 200 to a stagnation pressure of air flow 110 at a location proximate to and upstream of fan 160 is at least 1.05:1, at least 1.10:1, at least 1.15:1, at least 1.20:1, at least 1.25:1, at least 1.30:1, at least 1.35:1, at most 1.40:1, at most 1.32:1, at most 1.27:1, at most 1.22:1, at most 1.17:1, at most 1.12:1, and/or at most 1.07:1.

As used herein, the term "operative use," as used to describe a state and/or condition of subsonic turbofan engine 100, is intended to refer to any state and/or condition in which subsonic turbofan engine 100 is installed on and/or utilized in conjunction with vehicle 10 that is in operative use, such as to travel through air and/or to convey passengers and/or cargo. Subsonic turbofan engine 100 may be described as being in operative use regardless of whether subsonic turbofan engine 100 is producing, or operable to produce, a thrust. In particular, in some examples during operative use of subsonic turbofan engine 100, fan 160 may be inoperable to produce thrust, such as during an engine-out condition associated with subsonic turbofan engine 100. Accordingly, subsonic turbofan engine 100 may be described as being in either a thrust-operative state, in which fan 160 is operative to accelerate air flow 110, or a thrust-inoperative state, in which fan 160 is inoperative to accelerate air flow 110. In this manner, subsonic turbofan engine 100 may be in either of the thrust-operative state or the thrust-inoperative state during operative use of subsonic turbofan engine 100.

Core structure 130 may include any of a variety of components, such as may be representative of examples of prior art turbofan engines. In some examples, and as schematically illustrated in FIG. 2 and less schematically illustrated in FIG. 6, core structure 130 includes a compressor portion 132, a combustor portion 134, and a turbine portion 136. In particular, in such examples, compressor portion 132 is configured to compress inner air flow 112, while combustor portion 134 is configured to combust a mixture of inner air flow 112 and a fuel to generate a propulsive flow mixture 114. In such examples, turbine portion 136 is configured to extract energy from propulsive flow mixture 114 to generate the torque to rotate fan 160. More specifically, in such examples, and as schematically illustrated in FIG. 2 and less schematically illustrated in FIG. 6, subsonic turbofan engine 100 additionally includes a central shaft 140 that is configured to convey the torque from core structure 130 to fan 160.

In some examples, and as schematically illustrated in FIG. 2 and less schematically illustrated in FIG. 6, core structure 130 additionally includes a core nozzle 138, and subsonic turbofan engine 100 is configured to exhaust inner air flow 112 and/or propulsive flow mixture 114 via core nozzle 138. In some examples, subsonic turbofan engine 100 is configured such that expulsion of inner air flow 112 and/or of propulsive flow mixture 114 via core nozzle 138 contributes to the thrust generated by subsonic turbofan engine 100. However, in many examples, such as when subsonic turbofan engine 100 is a high-bypass turbofan engine 100, the thrust generated by subsonic turbofan engine 100 predominantly results from the expulsion of outer air flow 116 from bypass duct 154.

While the present disclosure generally pertains to examples in which core structure 130 includes compressor portion 132, combustor portion 134, and turbine portion 136, this is not required of all examples of subsonic turbofan engine 100. For example, it additionally is within the scope of the present disclosure that core structure 130 operates to generate the torque to rotate fan 160 at least partially via a non-combustion-driven process, such as via an electric motor. In particular, in some examples, subsonic turbofan engine 100 is an electric engine in which an electric motor generates at least a portion of the torque that drives fan 160 to rotate about engine longitudinal axis 102. In some such examples, engine core 120 and/or core structure 130 includes and/or is the electric motor. In such examples, subsonic turbofan engine 100 still may be referred to as a turbofan engine even in the absence of a gas-driven turbine, such as turbine portion 136 disclosed herein.

In some examples, and as schematically illustrated in FIG. 2, subsonic turbofan engine 100 additionally includes a gearbox 180 that is configured to vary a gear ratio between central shaft 140 and fan 160, such as to enable fan 160 to rotate at a sufficient rotational velocity to produce the thrust to propel vehicle 10. In particular, in some examples, gearbox 180 is configured to reduce a gear ratio from central shaft 140 to fan 160, thereby enabling fan 160 to rotate at a relatively low rotational velocity relative to that of central shaft 140 and/or turbine portion 136, which in turn enables configuring subsonic turbofan engine 100 with an increased bypass ratio. In such examples, central shaft 140 is operatively coupled to fan 160 via gearbox 180. In such examples, gearbox 180 may include and/or be any of a variety of geared mechanisms, such as a planetary reduction gearbox. In examples in which subsonic turbofan engine 100 includes gearbox 180, subsonic turbofan engine 100 additionally may be referred to as a geared turbofan engine 100.

Each OGV 200 may be configured to transition among the plurality of OGV configurations in any suitable manner. In some examples, and as schematically illustrated in FIGS. 2 and 5 and less schematically illustrated in FIGS. 3-4 and 6-7, each OGV 200 defines a respective OGV pivot axis 202 such that each OGV 200 is configured to pivot about the respective OGV pivot axis 202 to transition OGV 200 among the plurality of OGV configurations. In some examples, and as schematically illustrated in FIG. 2 and less schematically illustrated in FIG. 6, each respective OGV pivot axis 202 is at least substantially perpendicular to engine longitudinal axis 102. As schematically illustrated in FIGS. 2 and 5, OGV 200 also may be described as including and extending between a respective root end 220 positioned proximate to inner barrel 122 and a respective tip end 222 positioned proximate to outer barrel 152. In some examples, and as schematically illustrated in FIGS. 2 and 5, the respective OGV pivot axis 202 of each OGV 200 extends between the respective root end 220 and the respective tip end 222, and/or intersects one or both of the respective root end 220 and the respective tip end 222.

Each OGV 200 may be configured to pivot about the respective OGV pivot axis 202 through any suitable angular extent to yield the functionality described herein. In particular, in some examples, each OGV 200 is configured to pivot about the respective OGV pivot axis 202 through an angle that is at least 5 degrees, at least 10 degrees, at least 15 degrees, at least 20 degrees, at least 25 degrees, at least 30 degrees, at most 35 degrees, at most 27 degrees, at most 22 degrees, at most 17 degrees, at most 12 degrees, and/or at most 7 degrees as OGV 200 transitions from the nominal configuration to the reduced-drag configuration. In the present disclosure, a description of OGV 200 pivoting through a specified angle, or angular extent, is intended to describe an angular range or interval through which OGV 200 pivots as OGV 200 transitions from the nominal configuration to the reduced-drag configuration (or vice versa). As an example, a description of OGV 200 pivoting through an angle of 20 degrees as OGV 200 transitions from the nominal configuration to the reduced-drag configuration describes an example in which the difference between an angular position of at least a portion of OGV 200 when OGV 200 is in the nominal configuration and an angular position of the portion of OGV 200 when OGV 200 is in the reduced-drag configuration is 20 degrees.

FIGS. 3-4 illustrate examples of OGVs 200 as viewed along a direction parallel to OGV pivot axis 202 to demonstrate the pivotal action and aerodynamic functionality of OGVs 200. In FIGS. 3-4, the axis labeled 103 represents an axis extending along a direction parallel to engine longitudinal axis 102. Accordingly, as used herein, axis 103 also may be referred to as a direction 103 parallel to engine longitudinal axis 102.

In some examples during operative use of subsonic turbofan engine 100, and as illustrated in FIGS. 3-4, fan 160 (schematically illustrated in FIG. 2) induces a swirl in air flow 110 such that air flow 110 flowing away from fan 160 in downstream direction 104 flows in an air flow direction 170 that is angled relative to direction 103 parallel to engine longitudinal axis 102 by a swirl angle 172. In such examples, and as illustrated in solid lines in FIGS. 3-4, when each OGV 200 is in the nominal configuration during operative use of subsonic turbofan engine 100, each OGV 200 is oriented to alter air flow direction 170 such that swirl angle 172 at a location adjacent to and upstream of OGV 200 is greater than swirl angle 172 at a location adjacent to and downstream of OGV 200. As used herein, the term "swirl," as used to describe a property of air flow 110 downstream of fan 160, is intended to refer to a circumferential flow component of an absolute velocity vector of air flow 110. Accordingly, swirl angle 172 may be understood as referring to and/or characterizing an amount of rotation (e.g., about engine longitudinal axis 102) that occurs in the swirl of air flow 110 downstream of fan 160.

In this manner, the plurality of OGVs 200 collectively may be described as operating to straighten, and/or to remove a swirl and/or vorticity from, air flow 110 as air flow 110 traverses the plurality of OGVs 200. Stated another way, during operative use of subsonic turbofan engine 100 with fan 160 operable to accelerate air flow 110 and with each OGV 200 in the nominal configuration, the plurality of OGVs 200 collectively may be described as counteracting and/or mitigating the swirl and/or vorticity imposed upon air flow 110 by the rotation of fan 160 such that air flow 110 flows through subsonic turbofan engine 100 with a small and/or minimal degree of swirl. In particular, in some examples, minimizing and/or removing the swirl from air flow 110 ensures that a maximal proportion of a flow energy associated with air flow 110 is directed along downstream direction 104 and thus contributes to the thrust produced by subsonic turbofan engine 100. Additionally or alternatively, in some examples, minimizing and/or removing the swirl from air flow 110 enhances an aerodynamic efficiency of subsonic turbofan engine 100, such as by minimizing turbulent drag effects that may be associated with a swirl of air flow 110.

In some examples in which subsonic turbofan engine 100 is in operative use in the thrust-inoperative state, subsonic turbofan engine 100 is moving through air, such as under the thrust of a second subsonic turbofan engine 100 of vehicle 10 that is in the thrust-operative state. In such examples, subsonic turbofan engine 100 in the thrust-inoperative state exerts a drag force upon vehicle 10. In some such examples, fan 160 may be in a windmilling state in which fan 160 is free to rotate about engine longitudinal axis 102 under the force of an incoming air flow 110 but is inoperative to accelerate air flow 110 to generate thrust. In such examples, fan 160 may impart relatively little swirl upon air flow 110 such that air flow 110 travels along air flow direction 170 that is at least substantially parallel to engine longitudinal axis 102 when air flow 110 encounters the plurality of OGVs 200. Accordingly, in such a circumstance, an angled configuration of each OGV 200 relative to air flow direction 170 thus may introduce a source of drag, and/or may redirect air flow 110 in such a manner that air flow 110 separates from OGV 200 in a manner that generates turbulent drag. Accordingly, subsonic turbofan engines 100 according to the present disclosure are configured to mitigate a drag force produced by subsonic turbofan engine 100 when subsonic turbofan engine 100 is in the thrust-inoperative state. More specifically, in some examples, subsonic turbofan engine 100 is configured such that, during operative use of subsonic turbofan engine 100, each OGV 200 is in the nominal configuration when subsonic turbofan engine 100 is in the thrust-operative state and/or such that each OGV 200 is in the reduced-drag configuration when subsonic turbofan engine 100 is in the thrust-inoperative state. In particular, in such examples, when subsonic turbofan engine 100 is in the thrust-inoperative state and when each OGV 200 is in the reduced-drag configuration, each OGV is oriented to reduce a drag force exerted upon OGV 200 by air flow 110, and thereby reduce a drag force exerted upon vehicle 10 by subsonic turbofan engine 100, relative to a drag force exerted upon OGV 200 by air flow 110 when OGV 200 is in the nominal configuration.

Each OGV 200 may have any of a variety of forms and/or structures, such as may be similar to and/or characteristic of OGVs of prior art turbofan engines. As illustrated in FIGS. 3-5 and less schematically illustrated in FIG. 7, each OGV may be described as extending between and including a respective leading edge 232 and a respective trailing edge 242 that is spaced apart from leading edge 232 along downstream direction 104. Similarly, and as additionally illustrated in FIGS. 3-4 and less schematically illustrated in FIG. 7, each OGV may be described as including a respective leading edge region 230 that includes the respective leading edge 232, as well as a respective trailing edge region 240 that includes the respective trailing edge 242. In some examples, and as illustrated at least in FIG. 3, OGV pivot axis 202 of each OGV 200 extends through the respective leading edge region 230.

In some examples, and as illustrated in FIGS. 3-4, each OGV 200 may be described as defining a respective OGV chord line 204 and/or a respective OGV camber line 206. In particular, OGV chord line 204 refers to a line that extends between (e.g., directly between) the respective leading edge 232 and the respective trailing edge 242 along a direction perpendicular to the respective OGV pivot axis 202 and/or along direction 103 parallel to engine longitudinal axis 102. By contrast, OGV camber line 206 refers to a line that extends between the respective leading edge 232 and the respective trailing edge 242 in a plane that is perpendicular to the respective OGV pivot axis 202 and/or that is parallel to direction 103 parallel to engine longitudinal axis 102. Accordingly, and as illustrated in FIGS. 3-4, OGV camber line 206 is not necessarily a straight line. For example, in some examples, and as illustrated in FIGS. 3-4, OGV camber line 206 extends fully through (i.e., does not extend exterior of) OGV 200 between the respective leading edge 232 and the respective trailing edge 242 and follows a contour of OGV 200, such as to approximately bisect a profile of OGV 200 along a length thereof. In this manner, in some examples, and as illustrated in FIGS. 3-4, OGV camber line 206 is at least partially curved, and/or deviates from OGV chord line 204 of the respective OGV 200.

As illustrated in FIGS. 3-4, each OGV 200 may be characterized in terms of a respective OGV pitch angle 210 and/or a respective OGV angle of attack 212 thereof. Specifically, as illustrated in FIGS. 3-4, OGV pitch angle 210 refers to an angle as measured between the respective OGV camber line 206 at the respective leading edge 232 of the respective OGV 200 and direction 103 parallel to engine longitudinal axis 102, as viewed along a direction parallel to the respective OGV pivot axis 202. In this manner, OGV pitch angle 210 may be described as characterizing an angular position and/or orientation of the respective OGV 200 and/or the OGV configuration of the respective OGV 200. Accordingly, in such examples, subsonic turbofan engine 100 is configured such that the respective OGV pitch angle 210 of each respective OGV 200 varies as the respective OGV 200 transitions among the plurality of OGV configurations. By contrast, and with reference to FIGS. 3-4, OGV angle of attack 212 characterizes an angular position and/or orientation of the respective OGV 200 relative to air flow direction 170, which in turn may vary in orientation relative to engine longitudinal axis 102 depending upon an operational condition of subsonic turbofan engine 100. More specifically, and as illustrated in FIGS. 3-4, OGV angle of attack 212 refers to an angle as measured between the respective OGV camber line 206 at the respective leading edge 232 of the respective OGV 200 and air flow direction 170 at a location upstream of the respective OGV 200.

In some examples, and as illustrated in FIG. 3, subsonic turbofan engine 100 is configured such that an entirety of each OGV 200 pivots about the respective OGV pivot axis 202 as OGV 200 transitions among the plurality of OGV configurations. In particular, FIG. 3 illustrates an example in which OGV pivot axis 202 is positioned proximate to leading edge 232 and in which an entirety of OGV 200 pivots about OGV pivot axis 202 as OGV 200 transitions between the nominal configuration (solid lines) and the reduced-drag configuration (dashed lines).

In an example in which an entirety of OGV 200 is configured to pivot about OGV pivot axis 202, OGV pivot axis 202 may be positioned at, or proximal to, any of a variety of locations along a length of OGV 200 and/or of OGV camber line 206. For example, each OGV 200 may be characterized in terms of an OGV camber line length thereof, as measured along the respective OGV camber line 206 from the respective leading edge 232 to the respective trailing edge 242. Similarly, each OGV 200 may be characterized by a distance, as measured along the respective OGV camber line 206, from the respective leading edge 232 to a location along the respective OGV camber line 206 that is proximate to the respective OGV pivot axis 202. Specifically, in various examples in which an entirety of OGV 200 is configured to pivot about OGV pivot axis 202, the distance from the respective leading edge 232 to a location along the respective OGV camber line 206 that is proximate to the respective OGV pivot axis 202 is at least 0% of the respective OGV camber line length, at least 5% of the respective OGV camber line length, at least 10% of the respective OGV camber line length, at least 20% of the respective OGV camber line length, at least 30% of the respective OGV camber line length, at least 40% of the respective OGV camber line length, at least 50% of the respective OGV camber line length, at least 60% of the respective OGV camber line length, at most 75% of the respective OGV camber line length, at most 65% of the respective OGV camber line length, at most 55% of the respective OGV camber line length, at most 45% of the respective OGV camber line length, at most 35% of the respective OGV camber line length, at most 25% of the respective OGV camber line length, at most 15% of the respective OGV camber line length, at most 7% of the respective OGV camber line length, and/or at most 2% of the respective OGV camber line length.

In some examples in which an entirety of each OGV 200 is configured to pivot about the respective OGV pivot axis 202, each such OGV 200 may be described as operating in a manner similar to that of a weather vane. In particular, in such examples, each OGV 200 may be configured to pivot about the respective OGV pivot axis 202 at least partially responsive to a torque exerted upon OGV 200 by air flow 110 to transition toward and/or to the reduced-drag configuration and/or the nominal configuration. Accordingly, in some such examples, configuring OGV 200 such that OGV pivot axis 202 is proximate to the respective leading edge 232 facilitates OGV 200 pivoting to an at least substantially stable OGV configuration under the torque exerted by air flow 110.

Alternatively, in some examples, and as illustrated in FIGS. 4 and 7, each OGV 200 is configured such that, when OGV 200 transitions among the plurality of OGV configurations, the respective leading edge region 230 pivots about the respective OGV pivot axis 202 while the respective trailing edge region 240 remains stationary (e.g., rotationally stationary) relative to the respective OGV pivot axis 202. In particular, in the examples of FIGS. 4 and 7, trailing edge region 240 (illustrated in solid lines) remains fixed (e.g., relative to engine core 120 as schematically illustrated in FIG. 2, relative to OGV pivot axis 202, and/or relative to direction 103 parallel to engine longitudinal axis 102 illustrated in FIG. 4) while leading edge region 230 pivots about OGV pivot axis 202 to transition OGV 200 between the nominal configuration (solid lines) and the reduced-drag configuration (dashed lines).

In an example in which only leading edge region 230 of OGV 200 is configured to pivot about OGV pivot axis 202, OGV pivot axis 202 may be positioned at, or proximal to, any of a variety of locations along a length of OGV 200 and/or of OGV camber line 206. For example, and as discussed, each OGV 200 may be characterized in terms of an OGV camber line length thereof, as measured along the respective OGV camber line 206 from the respective leading edge 232 to the respective trailing edge 242, and/or by a distance, as measured along the respective OGV camber line 206, from the respective leading edge 232 to a location along the respective OGV camber line 206 that is proximate to the respective OGV pivot axis 202. Specifically, in various examples in which only leading edge region 230 of OGV 200 is configured to pivot about OGV pivot axis 202, the distance from the respective leading edge 232 to a location along the respective OGV camber line 206 that is proximate to the respective OGV pivot axis 202 is at least 0% of the respective OGV camber line length, at least 5% of the respective OGV camber line length, at least 10% of the respective OGV camber line length, at least 20% of the respective OGV camber line length, at least 30% of the respective OGV camber line length, at least 40% of the respective OGV camber line length, at least 50% of the respective OGV camber line length, at least 60% of the respective OGV camber line length, at most 75% of the respective OGV camber line length, at most 65% of the respective OGV camber line length, at most 55% of the respective OGV camber line length, at most 45% of the respective OGV camber line length, at most 35% of the respective OGV camber line length, at most 25% of the respective OGV camber line length, at most 15% of the respective OGV camber line length, at most 7% of the respective OGV camber line length, and/or at most 2% of the respective OGV camber line length.

As discussed, OGV 200 may be characterized with reference to a distance along the respective OGV camber line 206 from the respective leading edge 232 to a location along the respective OGV camber line 206 that is proximate to the respective OGV pivot axis 202. In some examples, such as in the example of FIG. 3, OGV 200 is configured such that the respective OGV pivot axis 202 intersects the respective OGV camber line 206. In other examples, such as in the example of FIG. 4, OGV 200 is configured such that the respective OGV pivot axis 202 is offset from the respective OGV camber line 206, such that the location along the respective OGV camber line 206 that is proximate to the respective OGV pivot axis 202 is spaced apart from the respective OGV pivot axis 202. In such examples, the respective OGV pivot axis 202 may be spaced apart from the respective OGV camber line 206 in any of a variety of manners. In particular, in some examples, such as in the example of FIG. 4, OGV pivot axis 202 is offset from OGV camber line 206 toward a suction side of OGV 200; that is, toward a side of OGV 200 that faces a region of relatively low pressure (e.g., relative to the opposite side of OGV 200) during operative use of subsonic turbofan engine 100.

In some examples in which only leading edge region 230 of OGV 200 is configured to pivot about OGV pivot axis 202, at least a portion of OGV 200 is fixedly coupled to another portion of subsonic turbofan engine 100. In particular, in some such examples, the respective trailing edge region 240 of each OGV 200 is fixedly coupled to inner barrel 122 and/or to outer barrel 152. In some such configurations, the respective trailing edge region 240 of each OGV 200 thus forms a structural load path between inner barrel 122 and outer barrel 152, such as to enhance a structural rigidity of subsonic turbofan engine 100.

Additionally, in an example in which only leading edge region 230 of OGV 200 is configured to pivot about OGV pivot axis 202, leading edge region 230 and trailing edge region 240 may have any of a variety of relative orientations and/or configurations as OGV 200 transitions among the plurality of OGV configurations. In some examples, and as illustrated in FIGS. 4 and 7, the respective leading edge region 230 of each OGV 200 directly engages the respective trailing edge region 240 when OGV 200 is in the nominal configuration (illustrated in solid lines in FIGS. 4 and 7) and/or when OGV 200 is in the reduced-drag configuration (illustrated in dashed lines in FIGS. 4 and 7). However, this is not required of all examples of OGV 200. In particular, in some examples, the respective leading edge region 230 of each OGV 200 is spaced apart from the respective trailing edge region 240 when OGV 200 is in the nominal configuration and/or in the reduced-drag configuration. In some such examples, a spatial separation between the respective leading edge region 230 and the respective trailing edge region 240 of each OGV 200 thus introduces a flow path for a portion of air flow 110 to travel between the respective leading edge region 230 and the respective trailing edge region 240.

Each OGV 200 of subsonic turbofan engine 100 may be configured to transition among the plurality of OGV configurations in any of a variety of manners. In some examples, each OGV 200 is configured to transition to the nominal configuration and/or to the reduced-drag configuration at least partially automatically. For example, in some such examples, each OGV 200 is configured to passively transition among the plurality of OGV configurations as a result of a torque imparted upon OGV 200 by air flow 110. More specifically, in some examples, and as illustrated in FIGS. 3-4, each OGV 200 is configured to be oriented such that, during operative use of subsonic turbofan engine 100, OGV 200 and/or leading edge region 230 thereof is at least substantially aligned with air flow 110, such as to minimize OGV angle of attack 212. Accordingly, in some examples, each OGV 200 is configured to pivot about the respective OGV pivot axis 202 at least partially based upon air flow direction 170 of air flow 110 immediately upstream of each OGV 200, such as to align at least leading edge region 230 of OGV 200 with air flow direction 170.

More specifically, in some examples, when fan 160 is operative to accelerate air flow 110 through subsonic turbofan engine 100 during operative use of subsonic turbofan engine 100, air flow 110 exerts a force upon each OGV 200 to urge the each OGV 200 toward and/or to the nominal configuration. In this manner, when subsonic turbofan engine 100 is in the thrust-operative state during operative use thereof, fan 160 may accelerate air flow 110 in such a manner that a force and/or torque imparted by air flow 110 upon each OGV 200 operates to bias each OGV 200 toward the nominal configuration and/or to at least partially maintain each OGV 200 in the nominal configuration.

Additionally or alternatively, in some examples, when subsonic turbofan engine 100 is in the thrust-inoperative state during operative use thereof, air flow 110 exerts a force upon each OGV 200 to urge each OGV 200 toward and/or to the reduced-drag configuration. In this manner, when subsonic turbofan engine 100 is in the thrust-inoperative state during operative use thereof, air flow direction 170 of air flow 110 may have a smaller swirl angle 172 immediately upstream of leading edge 232 of each OGV 200 relative to an example in which subsonic turbofan engine 100 is in the thrust-operative state. Accordingly, in some such examples, a force and/or torque imparted upon each OGV 200 by air flow 110 operates to bias each OGV 200 toward and/or to the reduced-drag configuration, in which at least a portion of OGV 200 is increasingly aligned with air flow direction 170 and/or with a direction parallel to engine longitudinal axis 102.

Additionally or alternatively, in some examples, each OGV 200 is configured to transition among the plurality of OGV configurations at least partially selectively and/or dynamically, such as via selective and/or dynamic control thereof. In particular, in some examples, and as schematically illustrated in FIGS. 2 and 5, subsonic turbofan engine 100 includes an OGV control system 250 configured to transition each OGV 200 between the nominal configuration and the reduced-drag configuration. In some examples, and as described herein, OGV control system 250 is configured to transition each OGV 200 of the plurality of OGVs 200 nominally fully in unison.

In some examples, subsonic turbofan engine 100 and/or OGV control system 250 is configured such that each respective OGV 200 of the plurality of OGVs 200 pivots about the respective OGV pivot axis 202 through the same (or nominally the same) angular extent, and/or to the same (or nominally the same) angular position, during operative use of subsonic turbofan engine 100. In particular, in some such examples, subsonic turbofan engine 100 and/or OGV control system 250 is configured such that OGV pitch angle 210 of each OGV 200 is nominally equal to OGV pitch angle 210 of each other OGV 200, such as when each OGV 200 is in the nominal configuration or in the reduced-drag configuration. However, this is not required of all examples of subsonic turbofan engine 100. For example, it additionally is within the scope of the present disclosure that subsonic turbofan engine 100 and/or OGV control system 250 is configured to pivot distinct OGVs 200 about the respective OGV pivot axes 202 through different angular extents and/or to bring the distinct OGVs 200 to different respective OGV pitch angles 210 during operative use of subsonic turbofan engine 100.

More specifically, in some examples, OGV control system 250 is configured to transition each OGV 200 among the plurality of OGV configurations such that the respective OGV pitch angle 210 of a first OGV 200 is different than the respective OGV pitch angle 210 of a second OGV 200 when each of the first OGV 200 and the second OGV 200 is in the nominal configuration. Additionally or alternatively, in some examples, OGV control system 250 is configured to transition each OGV 200 among the plurality of OGV configurations such that the respective OGV pitch angle 210 of a first OGV 200 is different than the respective OGV pitch angle 210 of a second OGV 200 when each of the first OGV 200 and the second OGV 200 is in the reduced-drag configuration. Additionally or alternatively, in some examples, OGV control system 250 is configured to transition each OGV 200 among the plurality of OGV configurations such that the respective OGV pitch angle 210 of each respective OGV 200 is at least partially based upon a position of the respective OGV 200 within subsonic turbofan engine 100, such as a circumferential location of the respective OGV 200 relative to engine longitudinal axis 102.

When present, OGV control system 250 may include any of a variety of components and may operate in any of a variety of manners. In some examples, and as schematically illustrated in FIGS. 2 and 5, each OGV 200 includes a respective driven end 224, and OGV control system 250 is configured to exert a pivoting torque on each OGV 200 at the respective driven end 224 thereof to pivot each OGV 200 about the respective OGV pivot axis 202. In some examples, and as schematically illustrated in FIGS. 2 and 5, the respective root end 220 of each OGV 200 is the respective driven end 224. However, this is not required of all examples of subsonic turbofan engine 100, and it additionally is within the scope of the present disclosure that the respective tip end 222 of each OGV 200 is the respective driven end 224.

In some examples, OGV control system 250 is configured to exert the pivoting torque on each OGV 200 only at one end thereof, such as at the respective root end 220 or at the respective tip end 222. Accordingly, in such examples, and as schematically illustrated in FIGS. 2 and 5, each OGV 200 may be described as including a respective non-driven end 226 opposite the respective driven end 224 that is not directly driven by OGV control system 250.

OGV control system 250 may include any of a variety of mechanisms for driving the respective driven end 224 of each OGV 200. In some examples, and as schematically illustrated in FIGS. 2 and 5, OGV control system 250 includes an OGV control ring 252 operatively coupled to the respective driven end 224 of each OGV 200. In such examples, OGV control system 250 further includes an OGV control ring actuator 260 configured to rotate OGV control ring 252 to transition each OGV 200 among the plurality of OGV configurations. In some such examples, OGV control ring 252 is operatively coupled to, and/or at least partially enclosed within, inner barrel 122 or outer barrel 152. In particular, FIGS. 2 and 5-6 illustrate examples in which OGV control ring 252 is operatively coupled to inner barrel 122. Additionally, in some examples, and as perhaps best illustrated in FIG. 6, OGV control ring 252 extends circumferentially around engine longitudinal axis 102 and in a plane at least substantially perpendicular to engine longitudinal axis 102.

When present, OGV control ring actuator 260 may include any of a variety of components and/or mechanisms for actuating OGV control ring 252. In some examples, and as schematically illustrated in FIG. 5, OGV control ring actuator 260 includes a control ring bracket 262 operatively coupled to OGV control ring 252 and configured to rotate OGV control ring 252. In particular, in such examples, and as schematically illustrated in FIG. 5, control ring bracket 262 is operatively coupled to OGV control ring 252 such that moving control ring bracket 262 (e.g., along a direction parallel to a length of OGV control ring 252) operates to rotate OGV control ring 252 about engine longitudinal axis 102 (schematically illustrated in FIG. 2), which in turn operates to pivot each OGV 200 about the respective OGV pivot axis 202. In some such examples, and as schematically illustrated in FIG. 5, OGV control ring actuator 260 additionally includes a push rod 264 operatively coupled to control ring bracket 262 and configured to convey a force to control ring bracket 262 to rotate OGV control ring 252. In some such examples, and as schematically illustrated in FIG. 5, OGV control ring actuator 260 additionally includes a crank assembly 266 including a crankshaft 268 operatively coupled to push rod 264 and/or an actuator motor 272 configured to rotate crankshaft 268. Specifically, in some such examples, OGV control ring actuator 260 is configured such that rotation of crankshaft 268, such as by actuator motor 272, operates to drive a linear motion of push rod 264, thereby urging control ring bracket 262 to rotate OGV control ring 252 as described herein. In some examples, and as schematically illustrated in FIG. 5, crank assembly 266 additionally includes a crankpin 270 that operatively couples crankshaft 268 to push rod 264. However, such configurations are not required of all examples of OGV control ring actuator 260, and it additionally is within the scope of the present disclosure that OGV control ring actuator 260 may include any additional and/or alternative mechanisms for driving rotation of OGV control ring 252.

In some examples, subsonic turbofan engine 100 is configured to at least partially retain each OGV 200 in the nominal configuration and/or in the reduced-drag configuration. In particular, in some examples, and as schematically illustrated in FIGS. 2 and 5, OGV control system 250 includes an OGV hold mechanism 254 configured to retain each OGV 200 in one or both of the nominal configuration or the reduced-drag configuration. In such examples, OGV hold mechanism 254 may operate to retain each OGV 200 in an OGV configuration that is at least substantially constant during operative use of subsonic turbofan engine 100, such as to restrict each OGV 200 from being jostled and/or buffeted by the force of air flow 110 in a manner that otherwise would vary the OGV configuration.

In some examples in which subsonic turbofan engine 100 is in the thrust-operative state during operative use thereof, OGV hold mechanism 254 operates to bias each OGV 200 toward the nominal configuration and/or to restrict each OGV 200 from transitioning (e.g., pivoting) away from the nominal configuration. Additionally or alternatively, in some examples in which subsonic turbofan engine 100 is in the thrust-inoperative state during operative use thereof, OGV hold mechanism 254 operates to bias each OGV 200 toward the reduced-drag configuration and/or to restrict each OGV 200 from transitioning (e.g., pivoting) away from the reduced-drag configuration.

In some examples, OGV hold mechanism 254 is operatively coupled to OGV control ring 252, such as to selectively maintain OGV control ring 252 in a rotational position corresponding to the nominal configuration and/or the reduced-drag configuration, and/or to restrict OGV control ring 252 from rotating to transition each OGV 200 away from the nominal configuration and/or the reduced-drag configuration. As more specific examples, in some examples, OGV hold mechanism 254 includes and/or is a brake mechanism that selectively engages OGV control ring 252 to restrict OGV control ring 252 from inadvertently rotating about engine longitudinal axis 102. In some other examples, OGV hold mechanism 254 directly engages one or more OGVs 200, such as to restrict a pivotal motion thereof.

Additionally or alternatively, in some examples, subsonic turbofan engine 100 is configured to at least partially constrain a pivotal range of motion of each OGV 200. In particular, in some examples, and as schematically illustrated in FIGS. 2 and 5, OGV control system 250 additionally includes a plurality of pivot stops 280 configured to at least partially restrict pivoting of OGVs 200. In particular, in some examples, each pivot stop 280 of at least a subset of the plurality of pivot stops 280 is configured to engage a corresponding OGV 200, such as at the respective root end 220, at the respective tip end 222, at the respective driven end 224, and/or at the respective non-driven end 226 of the corresponding OGV 200.

In some examples, and as schematically illustrated in FIG. 5, at least a subset of the plurality of pivot stops 280 are operatively and/or fixedly coupled to inner barrel 122. Accordingly, in some such examples, each pivot stop 280 is configured to engage the respective root end 220 of at least one OGV 200 to at least partially define a range of motion of each such OGV 200. Additionally or alternatively, in some examples, and as schematically illustrated in FIG. 5, at least a subset of the plurality of pivot stops 280 are operatively and/or fixedly coupled to outer barrel 152. Accordingly, in some such examples, each pivot stop 280 is configured to engage the respective tip end 222 of at least one OGV 200 to at least partially define a range of motion of each such OGV 200. Additionally or alternatively, in some examples, at least a subset of the plurality of pivot stops 280 are positioned and/or configured to collectively define the nominal configuration and/or the reduced-drag configuration of each OGV 200. FIG. 5 schematically illustrates an example in which OGV control system 250 includes a plurality of pivot stops 280 fixedly coupled to outer barrel 152 and positioned to engage the respective tip end 222 of each OGV 200.

In some examples, OGV control system 250 is configured such that a position and/or configuration of the plurality of pivot stops 280 is adjustable. In particular, in some examples, each pivot stop 280 of at least a subset of the plurality of pivot stops 280 is configured to be selectively and dynamically adjusted and/or moved relative to the plurality of OGVs 200 to selectively modify the nominal configuration and/or the reduced-drag configuration. More specifically, in some such examples, each pivot stop 280 of at least a subset of the plurality of pivot stops 280 is configured to be selectively and dynamically adjusted and/or moved to selectively modify the respective OGV pitch angle 210 of each OGV 200 when each OGV 200 is in the nominal configuration and/or in the reduced-drag configuration. In such examples, each such pivot stop 280 may be adjusted in any of a variety of manners. In particular, in some such examples, and as schematically illustrated in FIG. 2, OGV control system 250 additionally includes a stop control ring 282 operatively coupled to at least a subset of the plurality of pivot stops 280, as well as a stop control ring actuator 284 configured to rotate stop control ring 282 to selectively move the subset of pivot stops 280 relative to the plurality of OGVs 200.

When present, stop control ring actuator 284 may include any of a variety of components and/or mechanisms for actuating stop control ring 282. In some examples, and similar to OGV control ring actuator 260 discussed herein, stop control ring actuator 284 includes a control ring bracket 262 operatively coupled to stop control ring 282 and configured to rotate stop control ring 282. In particular, in such examples, control ring bracket 262 is operatively coupled to stop control ring 282 such that moving control ring bracket 262 (e.g., along a direction parallel to a length of stop control ring 282) operates to rotate stop control ring 282 about engine longitudinal axis 102, which in turn operates to move one or more pivot stops 280 relative to the plurality of OGVs 200. In some such examples, OGV control ring actuator 260 additionally includes a push rod 264 operatively coupled to control ring bracket 262 and configured to convey a force to control ring bracket 262 to rotate stop control ring 282. In some such examples, OGV control ring actuator 260 additionally includes a crank assembly 266 including a crankshaft 268 operatively coupled to push rod 264 and/or an actuator motor 272 configured to rotate crankshaft 268. Specifically, in some such examples, OGV control ring actuator 260 is configured such that rotation of crankshaft 268, such as by actuator motor 272, operates to drive a linear motion of push rod 264, thereby urging control ring bracket 262 to rotate stop control ring 282 as described herein. In some examples, and as schematically illustrated in FIG. 5, crank assembly 266 additionally includes a crankpin 270 that operatively couples crankshaft 268 to push rod 264. However, such a configuration is not required of all examples of stop control ring actuator 284, and it additionally is within the scope of the present disclosure that stop control ring actuator 284 may include any additional and/or alternative mechanisms for driving rotation of stop control ring 282.

In some examples, OGV control system 250 includes one or more components for at least partially controlling and/or regulating the respective OGV configuration of each OGV 200 in an active manner. In particular, in some examples, and as schematically illustrated in FIG. 2, OGV control system 250 includes a controller 290 programmed to selectively transition each OGV 200 among the plurality of OGV configurations. More specifically, in some such examples, and as schematically illustrated in FIGS. 2 and 5, controller 290 is programmed to generate an OGV control signal 292 and to transmit OGV control signal 292 to OGV control ring actuator 260 and/or to actuator motor 272 to selectively transition each OGV 200 among the plurality of OGV configurations.

Figure 8:
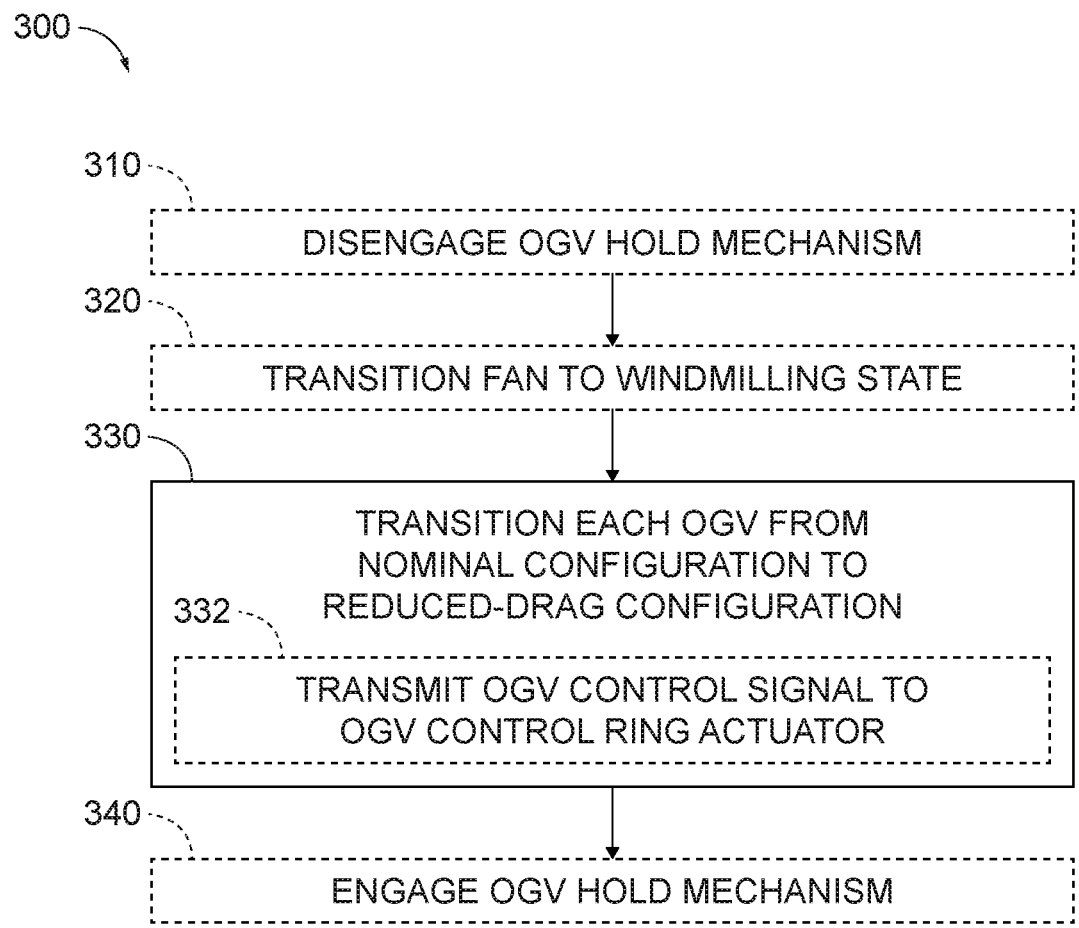
FIG. 8 is a flowchart representing examples of methods, according to the present disclosure, of operating a subsonic turbofan engine.

FIG. 8 is a flowchart representing examples of methods 300 of operating a subsonic turbofan engine, such as subsonic turbofan engine 100 disclosed herein. As shown in FIG. 8, a method 300 of operating a subsonic turbofan engine includes transitioning, at 330, each OGV of a plurality of OGVs from a nominal configuration to a reduced-drag configuration, as disclosed herein. Examples of subsonic turbofan engines and/or of OGVs that may be utilized in conjunction with methods 300 are disclosed herein with reference to subsonic turbofan engine 100 and/or OGVs 200, respectively. More specifically, methods 300 according to the present disclosure pertain to examples in which the subsonic turbofan engine includes a fan configured to rotate about an engine longitudinal axis to accelerate an air flow to propel the air flow through the subsonic turbofan engine in a downstream direction. Examples of fans, engine longitudinal axes, air flows, and/or downstream directions that may be utilized and/or referred to in conjunction with methods 300 are disclosed herein with reference to fan 160, engine longitudinal axis 102, air flows 110, and/or downstream direction 104, respectively.

In some examples, the transitioning each OGV from the nominal configuration to the reduced-drag configuration at 330 is performed responsive to the subsonic turbofan engine transitioning from a thrust-operative state to a thrust-inoperative state, as described herein. In particular, and as described herein, in some examples when the subsonic turbofan engine transitions from the thrust-operative state to the thrust-inoperative state, the fan of the subsonic turbofan engine ceases to impart a swirl on the air flow. In such a circumstance, a utility of the plurality of OGVs to reduce the swirl in the air flow is compromised and/or obviated, and the plurality of OGVs instead may then operate to introduce an undesirable drag force upon the subsonic turbofan engine as the subsonic turbofan engine travels through air. Accordingly, in such examples, and as described herein, the transitioning each OGV from the nominal configuration to the reduced-drag configuration at 330 includes transitioning such that the plurality of OGVs are oriented to reduce a drag force exerted upon the subsonic turbofan engine, relative to a drag force that would be encountered if the plurality of OGVs were to remain in the nominal configuration in such a circumstance. In some examples, the transitioning each OGV from the nominal configuration to the reduced-drag configuration at 330 is performed while the subsonic turbofan engine operates at subsonic speeds.

The transitioning each OGV from the nominal configuration to the reduced-drag configuration at 330 may be performed in any of a variety of manners, such as to reduce a drag force introduced by the plurality of OGVs in the event that the subsonic turbofan engine is transitioned to the thrust-inoperative state. In some examples, the transitioning each OGV from the nominal configuration to the reduced-drag configuration at 330 is performed at least partially automatically, such as at least partially due to a torque exerted upon each OGV by the air flow when the subsonic turbofan engine is in the thrust-inoperative state. In such examples, the transitioning each OGV from the nominal configuration to the reduced-drag configuration at 330 additionally or alternatively may be described as being performed at least passively.

In some examples, the fan of the subsonic turbofan engine remains free to rotate while the subsonic turbofan engine is in the thrust-inoperative state. In particular, in some examples, and as shown in FIG. 8, method 300 additionally includes transitioning, at 320, the fan to a windmilling state in which the fan is free to rotate about the engine longitudinal axis and in which the fan is inoperative to accelerate the air flow. Accordingly, when the fan is in the windmilling state while the subsonic turbofan engine travels through air, the air flow is introduced into the subsonic turbofan engine but is not accelerated through the subsonic turbofan engine by the fan. Instead, in such examples, when the fan is in the windmilling state, the incoming air flow operates to rotate the fan about the engine longitudinal axis before the air flow encounters the plurality of OGVs. In some examples, the transitioning the fan to the windmilling state at 320 is performed prior to the transitioning each OGV from the nominal configuration to the reduced-drag configuration at 330. In other examples, the transitioning the fan to the windmilling state at 320 is performed subsequent to the transitioning each OGV from the nominal configuration to the reduced-drag configuration at 330.

In some examples, the transitioning the fan to the windmilling state at 320 is performed responsive to the subsonic turbofan engine transitioning from the thrust-operative state to the thrust-inoperative state. In particular, in some examples, the subsonic turbofan engine may experience a condition and/or event, such as a fan blade off event, that reduces or compromises a capacity of the subsonic turbofan engine to produce thrust during operative use thereof. In some such examples, the condition and/or event that causes the subsonic turbofan engine to transition from the thrust-operative state to the thrust-inoperative state additionally and/or subsequently causes the fan to transition to the windmilling state. Additionally or alternatively, in some examples, method 300 includes actively performing the transitioning the fan to the windmilling state at 320 in response to an indication that the subsonic turbofan engine has transitioned to the thrust-inoperative state. As a more specific example, in some examples, a controller associated with the subsonic turbofan engine (such as may include and/or be controller 290 disclosed herein) commands the fan to transition to the windmilling state responsive to an indication that the subsonic turbofan engine has transitioned to the thrust-inoperative state.

In some examples, the transitioning each OGV from the nominal configuration to the reduced-drag configuration at 330 is performed at least partially actively. In particular, in some examples, and as described herein, the subsonic turbofan engine includes an OGV control system with an OGV control ring operatively coupled to each OGV and an OGV control ring actuator configured to rotate the OGV control ring. Examples of OGV control systems, OGV control rings, and/or OGV control ring actuators are disclosed herein with reference to OGV control system 250, OGV control ring 252, and/or OGV control ring actuator 260, respectively. Accordingly, in some such examples, the transitioning each OGV from the nominal configuration to the reduced-drag configuration at 330 includes utilizing the OGV control system and/or the OGV control ring actuator, as described herein.

In some such examples, the transitioning each OGV from the nominal configuration to the reduced-drag configuration at 330 further includes utilizing a controller of the OGV control system, such as controller 290 disclosed herein. More specifically, in some examples, and as shown in FIG. 8, the transitioning each OGV from the nominal configuration to the reduced-drag configuration at 330 includes transmitting, at 332 and with the controller, an OGV control signal (such as OGV control signal 292 disclosed herein) to the OGV control ring actuator. In some such examples, the transmitting the OGV control signal at 332 is performed responsive to the subsonic turbofan engine transitioning from the thrust-operative state to the thrust-inoperative state. Additionally or alternatively, in some examples, the transmitting the OGV control signal at 332 includes commanding the OGV control ring actuator to rotate the OGV control ring to transition each OGV to the reduced-drag configuration.

In some examples, method 300 additionally includes utilizing an OGV hold mechanism, such as OGV hold mechanism 254 disclosed herein, to permit and/or restrict each OGV from transitioning among the plurality of OGV configurations. In particular, in some examples, and as shown in FIG. 8, method 300 includes disengaging, at 310, the OGV hold mechanism to permit each OGV to transition among the plurality of OGV configurations. Specifically, in such examples, the disengaging the OGV hold mechanism at 310 is performed prior to the transitioning each OGV from the nominal configuration to the reduced-drag configuration at 330. Additionally or alternatively, in some examples, and as shown in FIG. 8, method 300 includes engaging, at 340, the OGV hold mechanism to restrict each OGV from transitioning among the plurality of OGV configurations. Specifically, in such examples, the engaging the OGV hold mechanism at 340 is performed subsequent to the transitioning each OGV from the nominal configuration to the reduced-drag configuration at 330, such as to retain each OGV in the reduced-drag configuration.

Illustrative, non-exclusive examples of inventive subject matter according to the present disclosure are described in the following enumerated paragraphs:

A1. A subsonic turbofan engine (100), comprising:
  an engine core (120) including a core structure (130) that is configured to generate a torque and an inner barrel (122) at least substantially enclosing the core structure (130);

a fan (160) including a plurality of fan blades (162) that are configured to revolve about an engine longitudinal axis (102) of the subsonic turbofan engine (100) to accelerate an air flow (110) to propel the air flow (110) through the subsonic turbofan engine (100) in a downstream direction (104) that is parallel to the engine longitudinal axis (102); wherein the fan (160) is operatively coupled to the engine core (120) such that the fan (160) is configured to receive the torque from the core structure (130) to revolve the plurality of fan blades (162);

an engine nacelle (150) circumferentially enclosing the fan (160) and including an outer barrel (152) circumferentially enclosing at least a portion of the engine core (120); and a plurality of outer guide vanes (OGVs) (200) positioned downstream of the fan (160);

wherein each respective OGV (200) of the plurality of OGVs (200) is configured to transition among a plurality of OGV configurations defined between and including a nominal configuration, in which the respective OGV (200) is oriented to reduce a swirl in the air flow (110) downstream of the fan (160), and a reduced-drag configuration, in which at least a portion of the respective OGV (200) is increasingly aligned with the downstream direction (104) relative to the nominal configuration.

A2. The subsonic turbofan engine (100) of paragraph A1, wherein each OGV (200) of the plurality of OGVs (200) extends between the inner barrel (122) and the outer barrel (152).

A3. The subsonic turbofan engine (100) of any of paragraphs A1-A2, wherein, during operative use of the subsonic turbofan engine (100), the fan (160) induces the swirl in the air flow (110) such that the air flow (110) flowing away from the fan (160) in the downstream direction (104) flows in an air flow direction (170) that is angled relative to a direction parallel to the engine longitudinal axis (102) by a swirl angle (172); and wherein, when each respective OGV (200) of the plurality of OGVs (200) is in the nominal configuration during operative use of the subsonic turbofan engine (100), each respective OGV (200) of the plurality of OGVs (200) is oriented to alter the air flow direction (170) such that the swirl angle (172) at a location adjacent to and upstream of the respective OGV (200) is greater than the swirl angle (172) at a location adjacent to and downstream of the respective OGV (200).

A4. The subsonic turbofan engine (100) of any of paragraphs A1-A3, wherein the subsonic turbofan engine (100) is configured such that, during operative use of the subsonic turbofan engine (100), each respective OGV (200) of the plurality of OGVs (200) is in the nominal configuration when the subsonic turbofan engine (100) is in a thrust-operative state, in which the fan (160) is operative to accelerate the air flow (110).

A5. The subsonic turbofan engine (100) of any of paragraphs A1-A4, wherein the subsonic turbofan engine (100) is configured such that, during operative use of the subsonic turbofan engine (100), each respective OGV (200) of the plurality of OGVs (200) is in the reduced-drag configuration when the subsonic turbofan engine (100) is in a thrust-inoperative state, in which the fan (160) is inoperative to accelerate the air flow (110).

A6. The subsonic turbofan engine (100) of paragraph A5, wherein, when the subsonic turbofan engine (100) is in the thrust-inoperative state and when each respective OGV (200) of the plurality of OGVs (200) is in the reduced-drag configuration, the respective OGV (200) is oriented to reduce a drag force exerted upon the respective OGV (200) by the air flow (110) relative to a drag force exerted upon the respective OGV (200) by the air flow (110) when the respective OGV (200) is in the nominal configuration.

A7. The subsonic turbofan engine (100) of any of paragraphs A1-A6, wherein each respective OGV (200) of the plurality of OGVs (200) defines a respective OGV pivot axis (202); and wherein each respective OGV (200) of the plurality of OGVs (200) is configured to pivot about the respective OGV pivot axis (202) to transition the respective OGV (200) among the plurality of OGV configurations.

A8. The subsonic turbofan engine (100) of paragraph A7, wherein each respective OGV pivot axis (202) is at least substantially perpendicular to the engine longitudinal axis (102).

A9. The subsonic turbofan engine (100) of any of paragraphs A7-A8, wherein each respective OGV (200) of the plurality of OGVs (200) is configured to pivot about the respective OGV pivot axis (202) through an angle that is one or more of at least 5 degrees, at least 10 degrees, at least 15 degrees, at least 20 degrees, at least 25 degrees, at least 30 degrees, at most 35 degrees, at most 27 degrees, at most 22 degrees, at most 17 degrees, at most 12 degrees, and at most 7 degrees as the respective OGV (200) transitions from the nominal configuration to the reduced-drag configuration.

A10. The subsonic turbofan engine (100) of any of paragraphs A1-A9, wherein each respective OGV (200) of the plurality of OGVs (200) extends between and includes a respective root end (220) positioned proximate to the inner barrel (122) and a respective tip end (222) positioned proximate to the outer barrel (152).

A11. The subsonic turbofan engine (100) of paragraph A10, wherein a/the respective OGV pivot axis (202) extends between the respective root end (220) and the respective tip end (222).

A12. The subsonic turbofan engine (100) of paragraph A11, wherein the respective OGV pivot axis (202) intersects one or both of the respective root end (220) and the respective tip end (222).

A13. The subsonic turbofan engine (100) of any of paragraphs A1-A12, wherein each respective OGV (200) of the plurality of OGVs (200) extends between and includes a respective leading edge (232) and a respective trailing edge (242) spaced apart from the respective leading edge (232) along the downstream direction (104).

A14. The subsonic turbofan engine (100) of paragraph A13, wherein each respective OGV (200) of the plurality of OGVs (200) includes a respective leading edge region (230) that includes the respective leading edge (232) and a respective trailing edge region (240) that includes the respective trailing edge (242).

A15. The subsonic turbofan engine (100) of paragraph A14, wherein a/the respective OGV pivot axis (202) extends through the respective leading edge region (230).

A16. The subsonic turbofan engine (100) of any of paragraphs A13-A15, wherein each respective OGV (200) of the plurality of OGVs (200) defines a respective OGV chord line (204) that extends between the respective leading edge (232) and the respective trailing edge (242) along a direction perpendicular to a/the respective OGV pivot axis (202).

A17. The subsonic turbofan engine (100) of any of paragraphs A13-A16, wherein each respective OGV (200) of the plurality of OGVs (200) defines a respective OGV camber line (206) that extends between the respective leading edge (232) and the respective trailing edge (242) in a plane that is perpendicular to a/the respective OGV pivot axis (202); optionally wherein the respective OGV camber line (206) fully extends through the respective OGV (200) and follows a contour of the respective OGV (200).

A18. The subsonic turbofan engine (100) of paragraph A17, wherein the respective OGV camber line (206) is at least partially curved.

A19. The subsonic turbofan engine (100) of any of paragraphs A17-A18, wherein the respective OGV camber line (206) deviates from a/the respective OGV chord line (204).

A20. The subsonic turbofan engine (100) of any of paragraphs A17-A19, wherein each respective OGV (200) of the plurality of OGVs (200) defines a respective OGV pitch angle (210), as measured between the respective OGV camber line (206) at the respective leading edge (232) and a direction (103) parallel to the engine longitudinal axis (102) as viewed along a direction parallel to the respective OGV pivot axis (202); and wherein the subsonic turbofan engine (100) is configured such that the respective OGV pitch angle (210) of each respective OGV (200) of the plurality of OGVs (200) varies as the respective OGV (200) transitions among the plurality of OGV configurations.

A21. The subsonic turbofan engine (100) of any of paragraphs A17-A20, wherein each respective OGV (200) of the plurality of OGVs (200) defines a respective OGV angle of attack (212), as measured between the respective OGV camber line (206) at the respective leading edge (232) and an/the air flow direction (170) at a location upstream of the respective OGV (200).

A22. The subsonic turbofan engine (100) of any of paragraphs A1-A21, wherein an entirety of each respective OGV (200) of the plurality of OGVs (200) is configured to pivot about a/the respective OGV pivot axis (202) as the respective OGV (200) transitions among the plurality of OGV configurations.

A23. The subsonic turbofan engine (100) of paragraph A22, wherein each respective OGV (200) of the plurality of OGVs (200) has a respective OGV camber line length, as measured along a/the respective OGV camber line (206) from a/the respective leading edge (232) to a/the respective trailing edge (242); and wherein, for each respective OGV (200) of the plurality of OGVs (200), a distance from the respective leading edge (232) to a location along the respective OGV camber line (206) that is proximate to the respective OGV pivot axis (202), as measured along the respective OGV camber line (206), is one or more of at least 0% of the respective OGV camber line length, at least 5% of the respective OGV camber line length, at least 10% of the respective OGV camber line length, at least 20% of the respective OGV camber line length, at least 30% of the respective OGV camber line length, at least 40% of the respective OGV camber line length, at least 50% of the respective OGV camber line length, at least 60% of the respective OGV camber line length, at most 75% of the respective OGV camber line length, at most 65% of the respective OGV camber line length, at most 55% of the respective OGV camber line length, at most 45% of the respective OGV camber line length, at most 35% of the respective OGV camber line length, at most 25% of the respective OGV camber line length, at most 15% of the respective OGV camber line length, at most 7% of the respective OGV camber line length, and at most 2% of the respective OGV camber line length.

A24. The subsonic turbofan engine (100) of any of paragraphs A1-A23, wherein the plurality of OGVs (200) are configured such that, when each respective OGV (200) of the plurality of OGVs (200) transitions among the plurality of OGV configurations, a/the respective leading edge region (230) pivots about a/the respective OGV pivot axis (202) and a/the respective trailing edge region (240) remains stationary relative to the respective OGV pivot axis (202).

A25. The subsonic turbofan engine (100) of paragraph A24, wherein each respective OGV (200) of the plurality of OGVs (200) has a/the respective OGV camber line length, as measured along a/the respective OGV camber line (206) from a/the respective leading edge (232) to a/the respective trailing edge (242) when the respective OGV (200) is in the nominal configuration; and wherein, for each respective OGV (200) of the plurality of OGVs (200), a distance from the respective leading edge (232) to a location along the respective OGV camber line (206) that is proximate to the respective OGV pivot axis (202), as measured along the respective OGV camber line (206) when the respective OGV (200) is in the nominal configuration, is one or more of at least 0% of the respective OGV camber line length, at least 5% of the respective OGV camber line length, at least 10% of the respective OGV camber line length, at least 20% of the respective OGV camber line length, at least 30% of the respective OGV camber line length, at least 40% of the respective OGV camber line length, at least 50% of the respective OGV camber line length, at least 60% of the respective OGV camber line length, at most 75% of the respective OGV camber line length, at most 65% of the respective OGV camber line length, at most 55% of the respective OGV camber line length, at most 45% of the respective OGV camber line length, at most 35% of the respective OGV camber line length, at most 25% of the respective OGV camber line length, at most 15% of the respective OGV camber line length, at most 7% of the respective OGV camber line length, and at most 2% of the respective OGV camber line length.

A26. The subsonic turbofan engine (100) of any of paragraphs A24-A25, wherein the respective trailing edge region (240) of each respective OGV (200) of the plurality of OGVs (200) is fixedly coupled to one or both of the inner barrel (122) and the outer barrel (152).

A27. The subsonic turbofan engine (100) of any of paragraphs A24-A26, wherein the respective trailing edge region (240) of each respective OGV (200) of the plurality of OGVs (200) forms a structural load path between the inner barrel (122) and the outer barrel (152).

A28. The subsonic turbofan engine (100) of any of paragraphs A24-A27, wherein the respective leading edge region (230) directly engages the respective trailing edge region (240) when the respective OGV (200) is in the nominal configuration.

A29. The subsonic turbofan engine (100) of any of paragraphs A24-A27, wherein the respective leading edge region (230) is spaced apart from the respective trailing edge region (240) when the respective OGV (200) is in the nominal configuration.

A30. The subsonic turbofan engine (100) of any of paragraphs A24-A29, wherein the respective leading edge region (230) directly engages the respective trailing edge region (240) when the respective OGV (200) is in the reduced-drag configuration.

A31. The subsonic turbofan engine (100) of any of paragraphs A24-A29, wherein the respective leading edge region (230) is spaced apart from the respective trailing edge region (240) when the respective OGV (200) is in the reduced-drag configuration.

A32. The subsonic turbofan engine (100) of any of paragraphs A1-A31, further comprising a bypass duct (154)

extending radially exterior of the inner barrel (122) and radially interior of the outer barrel (152); wherein the subsonic turbofan engine (100) is configured such that, during operative use of the subsonic turbofan engine (100), the air flow (110) includes an inner air flow (112) that flows through the engine core (120) and an outer air flow (116) that flows through the bypass duct (154).

A33. The subsonic turbofan engine (100) of paragraph A32, wherein the bypass duct (154) is at least partially defined by one or both of the inner barrel (122) and the outer barrel (152).

A34. The subsonic turbofan engine (100) of any of paragraphs A32-A33, wherein, during operative use of the subsonic turbofan engine (100), a time-averaged ratio of a mass of air in the outer air flow (116) to a mass of air in the inner air flow (112) is one or more of at least 5:1, at least 10:1, at least 15:1, at least 20:1, at least 30:1, at least 40:1, at least 50:1, at most 60:1, at most 45:1, at most 35:1, at most 25:1, at most 17:1, at most 12:1, and at most 7:1.

A35. The subsonic turbofan engine (100) of any of paragraphs A1-A34, wherein, during operative use of the subsonic turbofan engine (100), a ratio of a stagnation pressure of the air flow (110) proximate to and downstream of plurality of OGVs (200) to a stagnation pressure of the air flow (110) at a location proximate to and upstream of the fan (160) is one or more of at least 1.05:1, at least 1.10:1, at least 1.15:1, at least 1.20:1, at least 1.25:1, at least 1.30:1, at least 1.35:1, at most 1.40:1, at most 1.32:1, at most 1.27:1, at most 1.22:1, at most 1.17:1, at most 1.12:1, and at most 1.07:1.

A36. The subsonic turbofan engine (100) of any of paragraphs A1-A35, wherein the plurality of OGVs (200) includes, and optionally consists of, at least 2 OGVs (200), at least 5 OGVs (200), at least 10 OGVs (200), at least 15 OGVs (200), at least 20 OGVs (200), at least 25 OGVs (200), at least 30 OGVs (200), at most 40 OGVs (200), at most 27 OGVs (200), at most 22 OGVs (200), at most 17 OGVs (200), at most 12 OGVs (200), at most 7 OGVs (200), and at most 3 OGVs (200).

A37. The subsonic turbofan engine (100) of any of paragraphs A1-A36, wherein the subsonic turbofan engine (100) is configured to operate at subsonic speeds; optionally wherein the subsonic turbofan engine (100) is configured to operate only at subsonic speeds.

A38. The subsonic turbofan engine (100) of any of paragraphs A1-A37, wherein each respective OGV (200) of the plurality of OGVs (200) is configured to transition to one or both of the nominal configuration and the reduced-drag configuration at least partially automatically.

A39. The subsonic turbofan engine (100) of paragraph A38, wherein each respective OGV (200) of the plurality of OGVs (200) is configured to passively transition among the plurality of OGV configurations as a result of a torque imparted on the respective OGV (200) by the air flow (110).

A40. The subsonic turbofan engine (100) of any of paragraphs A38-A39, wherein, when the fan (160) is operative to accelerate the air flow (110) through the subsonic turbofan engine (100) during operative use of the subsonic turbofan engine (100), the air flow (110) exerts a force upon each OGV (200) of the plurality of OGVs (200) to urge each OGV (200) toward, and optionally to, the nominal configuration.

A41. The subsonic turbofan engine (100) of any of paragraphs A38-A40, wherein, when the subsonic turbofan engine (100) is in a/the thrust-inoperative state, the air flow (110) exerts a force upon each OGV (200) the plurality of OGVs (200) to urge each OGV (200) toward, and optionally to, the reduced-drag configuration.

A42. The subsonic turbofan engine (100) of any of paragraphs A1-A41, further comprising an OGV control system (250) configured to transition each OGV (200) of the plurality of OGVs (200) between the nominal configuration and the reduced-drag configuration.

A43. The subsonic turbofan engine (100) of paragraph A42, wherein the OGV control system (250) is configured to transition each respective OGV (200) of the plurality of OGVS (200) among the plurality of OGV configurations nominally fully in unison.

A44. The subsonic turbofan engine (100) of any of paragraphs A42-A43, wherein the OGV control system (250) is configured such that each respective OGV (200) of the plurality of OGVs (200) pivots about the respective OGV pivot axis (202) through nominally the same angular extent as the respective OGV (200) transitions between the nominal configuration and the reduced-drag configuration.

A45. The subsonic turbofan engine (100) of any of paragraphs A42-A43, wherein the OGV control system (250) is configured such that a first OGV (200) of the plurality of OGVs (200) pivots about the respective OGV pivot axis (202) of the first OGV (200) through an angular extent that is different than an angular extent through which a second OGV (200) of the plurality of OGVs (200) pivots about the respective OGV pivot axis (202) of the second OGV (200) when each of the first OGV (200) and the second OGV (200) transitions between the nominal configuration and the reduced-drag configuration.

A46. The subsonic turbofan engine (100) of any of paragraphs A42-A45, wherein the OGV control system (250) is configured such that a/the OGV pitch angle (210) of each OGV (200) of the plurality of OGVs (200) is nominally equal to the OGV pitch angle (210) of each other OGV (200) of the plurality of OGVs (200) when each OGV (200) of the plurality of OGVs (200) is in one of the nominal configuration or the reduced-drag configuration.

A47. The subsonic turbofan engine (100) of any of paragraphs A42-A45, wherein the OGV control system (250) is configured to transition each OGV (200) of the plurality of OGVs (200) among the plurality of OGV configurations such that the respective OGV pitch angle (210) of a first OGV (200) of the plurality of OGVs (200) is different than the respective OGV pitch angle (210) of a second OGV (200) of the plurality of OGVs (200) when each of the first OGV (200) and the second OGV (200) is in the nominal configuration.

A48. The subsonic turbofan engine (100) of any of paragraphs A42-A47, wherein the OGV control system (250) is configured to transition each OGV (200) of the plurality of OGVs (200) among the plurality of OGV configurations such that the respective OGV pitch angle (210) of a first OGV (200) of the plurality of OGVs (200) is different than the respective OGV pitch angle (210) of a second OGV (200) of the plurality of OGVs (200) when each of the first OGV (200) and the second OGV (200) is in the reduced-drag configuration.

A49. The subsonic turbofan engine (100) of any of paragraphs A42-A48, wherein the OGV control system (250) is configured to transition each OGV (200) of the plurality of OGVs (200) among the plurality of OGV configurations such that the respective OGV pitch angle (210) of each respective OGV (200) of the plurality of OGVs (200) is at least partially based upon a position of the respective OGV (200) within the subsonic turbofan engine (100), optionally a circumferential location of the respective OGV (200) relative to the engine longitudinal axis (102).

A50. The subsonic turbofan engine (100) of any of paragraphs A42-A49, wherein each respective OGV (200) of the plurality of OGVs (200) includes a respective driven end (224); and wherein the OGV control system (250) is configured to exert a pivoting torque on each respective OGV (200) of the plurality of OGVs (200) at the respective driven end (224) to pivot each respective OGV (200) about the respective OGV pivot axis (202).

A51. The subsonic turbofan engine (100) of paragraph A50, wherein a/the respective root end (220) is the respective driven end (224).

A52. The subsonic turbofan engine (100) of paragraph A50, wherein a/the respective tip end (222) is the respective driven end (224).

A53. The subsonic turbofan engine (100) of any of paragraphs A50-A52, wherein each respective OGV (200) of the plurality of OGVs (200) includes a respective non-driven end (226) opposite the respective driven end (224) that is not directly driven by the OGV control system (250).

A54. The subsonic turbofan engine (100) of any of paragraphs A50-A53, wherein the OGV control system (250) includes:
- an OGV control ring (252) operatively coupled to the respective driven end (224) of each respective OGV (200) of the plurality of OGVs (200); and
- an OGV control ring actuator (260) configured to rotate the OGV control ring (252) to transition each OGV (200) of the plurality of OGVs (200) among the plurality of OGV configurations.

A55. The subsonic turbofan engine (100) of paragraph A54, wherein the OGV control ring (252) is operatively coupled to one of the inner barrel (122) or the outer barrel (152).

A56. The subsonic turbofan engine (100) of any of paragraphs A54-A55, wherein the OGV control ring (252) extends circumferentially around the engine longitudinal axis (102) and in a plane at least substantially perpendicular to the engine longitudinal axis (102).

A57. The subsonic turbofan engine (100) of any of paragraphs A54-A56, wherein the OGV control ring actuator (260) includes one or more of:
- a control ring bracket (262) operatively coupled to the OGV control ring (252) and configured to rotate the OGV control ring (252);
- a push rod (264) operatively coupled to the control ring bracket (262) and configured to convey a force to the control ring bracket (262) to rotate the OGV control ring (252);
- a crank assembly (266) including a crankshaft (268) operatively coupled to the push rod (264); optionally wherein the crank assembly (266) further includes a crankpin (270) that operatively couples the crankshaft (268) to the push rod (264); and
- an actuator motor (272) configured to rotate the crankshaft (268).

A58. The subsonic turbofan engine (100) of paragraph A57, wherein the OGV control ring actuator (260) is configured such that rotation of the crankshaft (268) operates to drive a linear motion of the push rod (264), thereby urging the control ring bracket (262) to rotate the OGV control ring (252).

A59. The subsonic turbofan engine (100) of any of paragraphs A42-A58, wherein the OGV control system (250) includes an OGV hold mechanism (254) configured to retain each OGV (200) of the plurality of OGVs (200) in one or both of the nominal configuration or the reduced-drag configuration.

A60. The subsonic turbofan engine (100) of paragraph A59, wherein, while the subsonic turbofan engine (100) is in a/the thrust-operative state during operative use of the subsonic turbofan engine (100), the OGV hold mechanism (254) operates to one or both of:
  (i) bias each OGV (200) of the plurality of OGVs (200) toward the nominal configuration; and
  (ii) restrict each OGV (200) of the plurality of OGVs (200) from transitioning away from the nominal configuration.

A61. The subsonic turbofan engine (100) of any of paragraphs A59-A60, wherein, while the subsonic turbofan engine (100) is in a/the thrust-inoperative state, the OGV hold mechanism (254) operates to one or both of:
  (i) bias each OGV (200) of the plurality of OGVs (200) toward the reduced-drag configuration; and
  (ii) restrict each OGV (200) of the plurality of OGVs (200) from transitioning away from the reduced-drag configuration.

A62. The subsonic turbofan engine (100) of any of paragraphs A59-A61, wherein the OGV hold mechanism (254) is operatively coupled to an/the OGV control ring (252).

A63. The subsonic turbofan engine (100) of any of paragraphs A42-A62, wherein the OGV control system (250) further includes a plurality of pivot stops (280) configured to at least partially restrict pivoting of the plurality of OGVs (200).

A64. The subsonic turbofan engine (100) of paragraph A63, wherein at least a subset of the plurality of pivot stops (280) collectively define the nominal configuration of each OGV (200) of the plurality of OGVs (200).

A65. The subsonic turbofan engine (100) of any of paragraphs A63-A64, wherein at least a subset of the plurality of pivot stops (280) collectively define the reduced-drag configuration of each OGV (200) of the plurality of OGVs (200).

A66. The subsonic turbofan engine (100) of any of paragraphs A63-A65, wherein each pivot stop (280) of at least a subset of the plurality of pivot stops (280) is configured to engage a corresponding OGV (200) of the plurality of OGVs (200); optionally to engage one or more of a/the root end (220), a/the tip end (222), a/the driven end (224), and a/the non-driven end (226).

A67. The subsonic turbofan engine (100) of any of paragraphs A63-A66, wherein each pivot stop (280) of at least a subset of the plurality of pivot stops (280) is operatively coupled to the inner barrel (122); optionally fixedly coupled to the inner barrel (122).

A68. The subsonic turbofan engine (100) of any of paragraphs A63-A67, wherein each pivot stop (280) of at least a subset of the plurality of pivot stops (280) is operatively coupled to the outer barrel (152); optionally fixedly coupled to the outer barrel (152).

A69. The subsonic turbofan engine (100) of any of paragraphs A63-A68, wherein each pivot stop (280) of at least a subset of the plurality of pivot stops (280) is configured to be selectively and dynamically moved relative to the plurality of OGVs (200) to selectively modify one or both of the nominal configuration and the reduced-drag configuration; optionally to selectively modify a/the respective OGV pitch angle (210) of each respective OGV (200) of the plurality of OGVs (200) when each respective OGV (200) of the plurality of OGVs (200) is in one or both of the nominal configuration and the reduced-drag configuration.

A70. The subsonic turbofan engine (100) of any of paragraphs A63-A69, wherein the OGV control system (250) includes:
- a stop control ring (282) operatively coupled to at least a subset of the plurality of pivot stops (280); and
- a stop control ring actuator (284) configured to rotate the stop control ring (282) to selectively move the subset of the plurality of pivot stops (280) relative to the plurality of OGVs (200).

A71. The subsonic turbofan engine (100) of paragraph A70, wherein the stop control ring actuator (284) includes one or more of:
- a control ring bracket (262) operatively coupled to the stop control ring (282) and configured to rotate the stop control ring (282);
- a push rod (264) operatively coupled to the control ring bracket (262) and configured to convey a force to the control ring bracket (262) to rotate the stop control ring (282);
- a crank assembly (266) including a crankshaft (268) operatively coupled to the push rod (264); optionally wherein the crank assembly (266) further includes a crankpin (270) that operatively couples the crankshaft (268) to the push rod (264); and
- an actuator motor (272) configured to rotate the crankshaft (268).

A72. The subsonic turbofan engine (100) of paragraph A71, wherein the stop control ring actuator (284) is configured such that rotation of the crankshaft (268) operates to drive a linear motion of the push rod (264), thereby urging the control ring bracket (262) to rotate the stop control ring (282).

A73. The subsonic turbofan engine (100) of any of paragraphs A42-A72, wherein the OGV control system (250) further includes a controller (290) programmed to selectively transition each OGV (200) of the plurality of OGVs (200) among the plurality of OGV configurations.

A74. The subsonic turbofan engine (100) of paragraph A73, wherein the controller (290) is programmed to generate an OGV control signal (292) and transmit the OGV control signal (292) to an/the OGV control ring actuator (260) to selectively transition each OGV (200) of the plurality of OGVs (200) among the plurality of OGV configurations.

A75. The subsonic turbofan engine (100) of paragraph A74, wherein the controller (290) is programmed to transmit the OGV control signal (292) to an/the actuator motor (272) of the OGV control ring actuator (260) to rotate a/the crankshaft (268) of a/the crank assembly (266) of the OGV control ring actuator (260).

A76. The subsonic turbofan engine (100) of any of paragraphs A1-A75, wherein the core structure (130) includes:
- a compressor portion (132) configured to compress an/the inner air flow (112);
- a combustor portion (134) configured to combust a mixture of the inner air flow (112) and a fuel to generate a propulsive flow mixture (114); and
- a turbine portion (136) configured to extract energy from the propulsive flow mixture (114) to generate the torque; and
- wherein the subsonic turbofan engine (100) further includes a central shaft (140) configured to convey the torque from the core structure (130) to the fan (160).

A77. The subsonic turbofan engine (100) of paragraph A76, further comprising a gearbox (180) configured to vary a gear ratio between the central shaft (140) and the fan (160); and wherein the central shaft (140) is operatively coupled to the fan (160) via the gearbox (180).

A78. The subsonic turbofan engine (100) of any of paragraphs A1-A77, wherein the core structure (130) includes a core nozzle (138); and wherein the subsonic turbofan engine (100) is configured to exhaust one or both of an/the inner air flow (112) and a/the propulsive flow mixture (114) via the core nozzle (138).

A79. The subsonic turbofan engine (100) of any of paragraphs A1-A78, wherein the core structure (130) operates to generate at least a portion of the torque electrically.

A80. The subsonic turbofan engine (100) of paragraph A79, wherein one or both of the engine core (120) and the core structure (130) includes, and optionally is, an electric motor.

B1. A vehicle (10) comprising the subsonic turbofan engine (100) of any of paragraphs A1-A80.

B2. The vehicle (10) of paragraph B1, wherein the vehicle (10) is an aircraft (20).

B3. The vehicle (10) of paragraph B2, wherein the aircraft (20) includes a fuselage (30) and one or more wings (40) extending from the fuselage (30); and wherein the subsonic turbofan engine (100) is operatively coupled to the one or more wings (40), optionally via an engine mount structure (42).

B4. The vehicle (10) of any of paragraphs B2-B3, wherein the subsonic turbofan engine (100) is one or both of:
(i) operatively coupled to an/the fuselage (30) of the aircraft (20), optionally via an/the engine mount structure (42); and
(ii) at least partially incorporated into the fuselage (30) of the aircraft (20).

B5. The vehicle (10) of any of paragraphs B2-B4, wherein the aircraft (20) includes a tail assembly (50); and wherein the subsonic turbofan engine (100) is one or both of:
(i) operatively coupled to the tail assembly (50), optionally via an/the engine mount structure (42); and
(ii) at least partially incorporated into the tail assembly (50).

B6. The vehicle (10) of paragraph B5, wherein the tail assembly (50) includes one or both of a vertical stabilizer (52) and a horizontal stabilizer (54); and wherein the subsonic turbofan engine (100) is one or both of:
(i) operatively coupled to one or both of the vertical stabilizer (52) and the horizontal stabilizer (54), optionally via the engine mount structure (42); and
(ii) at least partially incorporated into one or both of the vertical stabilizer (52) and the horizontal stabilizer (54).

B7. The vehicle (10) of any of paragraphs B1-B6, wherein the vehicle (10) is configured to operate only at subsonic speeds.

C1. A method (300) of operating the subsonic turbofan engine (100) of any of paragraphs A1-A80, the method comprising:
- transitioning (330) each OGV (200) of the plurality of OGVs (200) from the nominal configuration to the reduced-drag configuration.

C2. The method (300) of paragraph C1, wherein the transitioning (330) each OGV (200) from the nominal configuration to the reduced-drag configuration is performed responsive to the subsonic turbofan engine (100) transitioning from a/the thrust-operative state to a/the thrust-inoperative state.

C3. The method (300) of any of paragraphs C1-C2, wherein the transitioning (330) each OGV (200) from the nominal configuration to the reduced-drag configuration is performed while the subsonic turbofan engine (100) operates at subsonic speeds.

C4. The method (300) of any of paragraphs C1-C3, wherein the transitioning (330) each OGV (200) from the nominal configuration to the reduced-drag configuration is performed at least partially automatically.

C5. The method (300) of any of paragraphs C1-C4, further comprising:

transitioning (320) the fan (160) to a windmilling state in which the fan (160) is free to rotate about the engine longitudinal axis (102) and in which the fan (160) is inoperative to accelerate the air flow (110).

C6. The method (300) of paragraph C5, wherein the transitioning (320) the fan (160) to the windmilling state is performed responsive to the subsonic turbofan engine (100) transitioning from a/the thrust-operative state to a/the thrust inoperative state.

C7. The method (300) of any of paragraphs C5-C6, wherein the transitioning (320) the fan (160) to the windmilling state is performed prior to the transitioning (330) each OGV (200) from the nominal configuration to the reduced-drag configuration.

C8. The method (300) of any of paragraphs C5-C6, wherein the transitioning (320) the fan (160) to the windmilling state is performed subsequent to the transitioning each OGV (200) from the nominal configuration to the reduced-drag configuration.

C9. The method (300) of any of paragraphs C1-C8, wherein the transitioning (330) each OGV (200) from the nominal configuration to the reduced-drag configuration is performed at least partially actively.

C10. The method (300) of paragraph C9, wherein the transitioning (330) each OGV (200) from the nominal configuration to the reduced-drag configuration includes utilizing one or both of an/the OGV control system (250) and an/the OGV control ring actuator (260).

C11. The method (300) of paragraph C10, wherein the transitioning (330) each OGV (200) from the nominal configuration to the reduced-drag configuration includes transmitting (332), with a/the controller (290), an/the OGV control signal (292) to the OGV control ring actuator (260).

C12. The method (300) of paragraph C11, wherein the transmitting (332) the OGV control signal (292) to the OGV control ring actuator (260) is performed responsive to the subsonic turbofan engine (100) transitioning from a/the thrust-operative state to a/the thrust-inoperative state.

C13. The method (300) of any of paragraphs C11-C12, wherein the transmitting (332) the OGV control signal (292) to the OGV control ring actuator (260) includes commanding the OGV control ring actuator (260) to rotate an/the OGV control ring (252) to transition each OGV (200) of the plurality of OGVs (200) to the reduced-drag configuration.

C14. The method (300) of any of paragraphs C1-C13, further comprising, prior to the transitioning (330) each OGV (200) from the nominal configuration to the reduced-drag configuration, disengaging (310) a/the OGV hold mechanism (254) to permit each OGV (200) of the plurality of OGVs (200) to transition among the plurality of OGV configurations.

C15. The method (300) of any of paragraphs C1-C14, further comprising, subsequent to the transitioning (330) each OGV (200) from the nominal configuration to the reduced-drag configuration, engaging (340) a/the OGV hold mechanism (254) to restrict each OGV (200) of the plurality of OGVs (200) from transitioning among the plurality of OGV configurations.

D1. A method (300) of operating a subsonic turbofan engine (100) including a fan (160) configured to rotate about an engine longitudinal axis (102) to accelerate an air flow (110) to propel the air flow (110) through the subsonic turbofan engine (100) in a downstream direction (104) and a plurality of outer guide vanes (OGVs) (200) positioned downstream of the fan (160), the method comprising:

transitioning (330) each respective OGV (200) of the plurality of OGVs (200) from a nominal configuration, in which the respective OGV (200) is oriented to reduce a swirl in the air flow (110) downstream of the fan (160), to a reduced-drag configuration, in which at least a portion of the respective OGV (200) is increasingly aligned with the downstream direction (104) relative to the nominal configuration.

D2. The method (300) of paragraph D1, wherein the transitioning (330) each OGV (200) from the nominal configuration to the reduced-drag configuration is performed responsive to the subsonic turbofan engine (100) transitioning from a thrust-operative state, in which the fan (160) is operative to accelerate the air flow (110), to a thrust-inoperative state, in which the fan (160) is inoperative to accelerate the air flow (110).

D3. The method (300) of any of paragraphs D1-D2, wherein the transitioning (330) each OGV (200) from the nominal configuration to the reduced-drag configuration is performed while the subsonic turbofan engine (100) operates at subsonic speeds.

D4. The method (300) of any of paragraphs D1-D3, wherein the transitioning (330) each OGV (200) from the nominal configuration to the reduced-drag configuration is performed at least partially automatically.

D5. The method (300) of any of paragraphs D1-D4, further comprising:

transitioning (320) the fan (160) to a windmilling state in which the fan (160) is free to rotate about the engine longitudinal axis (102) and in which the fan (160) is inoperative to accelerate the air flow (110).

D6. The method (300) of paragraph D5, wherein the transitioning (320) the fan (160) to the windmilling state is performed responsive to the subsonic turbofan engine (100) transitioning from a/the thrust-operative state to a/the thrust-inoperative state.

D7. The method (300) of any of paragraphs D5-D6, wherein the transitioning (320) the fan (160) to the windmilling state is performed prior to the transitioning (330) each OGV (200) from the nominal configuration to the reduced-drag configuration.

D8. The method (300) of any of paragraphs D5-D6, wherein the transitioning (320) the fan (160) to the windmilling state is performed subsequent to the transitioning (330) each OGV (200) from the nominal configuration to the reduced-drag configuration.

D9. The method (300) of any of paragraphs D1-D8, wherein the transitioning (330) each OGV (200) from the nominal configuration to the reduced-drag configuration is performed at least partially actively.

D10. The method (300) of paragraph D9, wherein the subsonic turbofan engine (100) further includes an OGV control system (250) configured to transition each OGV (200) of the plurality of OGVs (200) between the nominal configuration and the reduced-drag configuration; wherein each respective OGV (200) of the plurality of OGVs (200) includes a respective driven end (224); wherein the OGV control system (250) is configured to exert a pivoting torque on each respective OGV (200) of the plurality of OGVs (200) at the respective driven end (224) to pivot each respective OGV (200) about the respective OGV pivot axis (202); wherein the OGV control system (250) includes:
- an OGV control ring (252) operatively coupled to the respective driven end (224) of each respective OGV (200) of the plurality of OGVs (200); and
- an OGV control ring actuator (260) configured to rotate the OGV control ring (252) to transition each OGV (200) of the plurality of OGVs (200) among a plurality of OGV configurations defined between and including the nominal configuration and the reduced-drag configuration; and
- wherein the transitioning (330) each OGV (200) from the nominal configuration to the reduced-drag configuration includes utilizing one or both of the OGV control system (250) and the OGV control ring actuator (260).

D11. The method (300) of paragraph D10, wherein the OGV control system (250) further includes a controller (290) programmed to generate an OGV control signal (292) and transmit the OGV control signal (292) to the OGV control ring actuator (260) to selectively transition each OGV (200) of the plurality of OGVs (200) among the plurality of OGV configurations; and wherein the transitioning (330) each OGV (200) from the nominal configuration to the reduced-drag configuration includes transmitting (332), with the controller (290), the OGV control signal (292) to the OGV control ring actuator (260).

D12. The method (300) of paragraph D11, wherein the transmitting (332) the OGV control signal (292) to the OGV control ring actuator (260) is performed responsive to the subsonic turbofan engine (100) transitioning from a/the thrust-operative state to a/the thrust-inoperative state.

D13. The method (300) of any of paragraphs D11-D12, wherein the transmitting (332) the OGV control signal (292) to the OGV control ring actuator (260) includes commanding the OGV control ring actuator (260) to rotate the OGV control ring (252) to transition each OGV (200) of the plurality of OGVs (200) to the reduced-drag configuration.

D14. The method (300) of any of paragraphs D1-D13, wherein the OGV control system (250) includes an OGV hold mechanism (254) configured to retain each OGV (200) of the plurality of OGVs (200) in one or both of the nominal configuration or the reduced-drag configuration; and wherein the method further includes, prior to the transitioning (330) each OGV (200) from the nominal configuration to the reduced-drag configuration, disengaging (310) the OGV hold mechanism (254) to permit each OGV (200) of the plurality of OGVs (200) to transition among the plurality of OGV configurations.

D15. The method (300) of any of paragraphs D1-D14, wherein the OGV control system (250) includes an/the OGV hold mechanism (254) configured to retain each OGV (200) of the plurality of OGVs (200) in one or both of the nominal configuration or the reduced-drag configuration; and wherein the method further includes, subsequent to the transitioning (330) each OGV (200) from the nominal configuration to the reduced-drag configuration, engaging (340) the OGV hold mechanism (254) to restrict each OGV (200) of the plurality of OGVs (200) from transitioning among the plurality of OGV configurations.

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

As used herein, the phrase "nominally fully," when modifying a degree or relationship, includes the full extent of the recited degree or relationship as well as degrees or relationships that differ from the full extent of the recited degree or relationship by up to 1%. For example, a first direction that is nominally fully parallel to a second direction includes a first direction that is within an angular deviation of 0.9° relative to the second direction and also includes a first direction that is identical to the second direction. In this manner, the phrase "nominally fully" may be substituted in place of the phrase "at least substantially." Stated differently, as used herein, the phrase "at least substantially" is intended to encompass degrees or relationships that are described with the phrase "nominally fully." Similarly, as used herein, the phrase "nominally equal," as used to compare a first quantity and a second quantity, describes examples in which the first quantity and the second quantity are exactly equal to one another, as well as examples in which the first quantity and the second quantity differ from one another by up to 1%.

As used herein, the terms "selective" and "selectively," when modifying an action, movement, configuration, or other activity of one or more components or characteristics of an apparatus, mean that the specific action, movement, configuration, or other activity is a direct or indirect result of one or more dynamic processes, as described herein. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order, concurrently, and/or repeatedly. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

The various disclosed elements of apparatuses and systems and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein and such inventive subject matter may find utility in apparatuses, systems, and/or methods that are not expressly disclosed herein.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A subsonic turbofan engine, comprising:
  an engine core including a core structure that is configured to generate a torque and an inner barrel at least substantially enclosing the core structure;
  a fan including a plurality of fan blades that are configured to revolve about an engine longitudinal axis of the subsonic turbofan engine to accelerate an air flow to propel the air flow through the subsonic turbofan engine in a downstream direction that is parallel to the engine longitudinal axis;
  wherein the fan is operatively coupled to the engine core such that the fan is configured to receive the torque from the core structure to revolve the plurality of fan blades;
  an engine nacelle circumferentially enclosing the fan and including an outer barrel circumferentially enclosing at least a portion of the engine core; a plurality of outer guide vanes (OGVs) positioned downstream of the fan; and
  a plurality of pivot stops configured to at least partially restrict pivoting of the plurality of OGVs;

wherein each respective OGV of the plurality of OGVs is configured to transition among a plurality of OGV configurations defined between and including a nominal configuration, in which the respective OGV is oriented to reduce a swirl in the air flow downstream of the fan, and a reduced-drag configuration, in which at least a portion of the respective OGV is increasingly aligned with the downstream direction relative to the nominal configuration; and wherein each pivot stop of at least a subset of the plurality of pivot stops is configured to be selectively and dynamically moved relative to the plurality of OGVs to selectively modify one or both of the nominal configuration and the reduced-drag configuration.

2. The subsonic turbofan engine of claim 1, wherein the subsonic turbofan engine is configured such that, during operative use of the subsonic turbofan engine, each respective OGV of the plurality of OGVs is in the nominal configuration when the subsonic turbofan engine is in a thrust-operative state, in which the fan is operative to accelerate the air flow, and each respective OGV of the plurality of OGVs is in the reduced-drag configuration when the subsonic turbofan engine is in a thrust-inoperative state, in which the fan is inoperative to accelerate the air flow.

3. The subsonic turbofan engine of claim 1, wherein each respective OGV of the plurality of OGVs defines a respective OGV pivot axis; and wherein each respective OGV of the plurality of OGVs is configured to pivot about the respective OGV pivot axis to transition the respective OGV among the plurality of OGV configurations.

4. The subsonic turbofan engine of claim 3, wherein each respective OGV of the plurality of OGVs is configured to pivot about the respective OGV pivot axis through an angle that is at least 5 degrees and at most 35 degrees as the respective OGV transitions from the nominal configuration to the reduced-drag configuration.

5. The subsonic turbofan engine of claim 3, wherein each respective OGV of the plurality of OGVs extends between and includes a respective leading edge and a respective trailing edge spaced apart from the respective leading edge along the downstream direction; wherein each respective OGV of the plurality of OGVs defines a respective OGV camber line that extends between the respective leading edge and the respective trailing edge in a plane that is perpendicular to the respective OGV pivot axis; wherein each respective OGV of the plurality of OGVs defines a respective OGV pitch angle, as measured between the respective OGV camber line at the respective leading edge and a direction parallel to the engine longitudinal axis as viewed along a direction parallel to the respective OGV pivot axis; and wherein the subsonic turbofan engine is configured such that the respective OGV pitch angle of each respective OGV of the plurality of OGVs varies as the respective OGV transitions among the plurality of OGV configurations.

6. The subsonic turbofan engine of claim 3, wherein an entirety of each respective OGV of the plurality of OGVs is configured to pivot about the respective OGV pivot axis as the respective OGV transitions among the plurality of OGV configurations.

7. The subsonic turbofan engine of claim 6, wherein each respective OGV of the plurality of OGVs extends between and includes a respective leading edge and a respective trailing edge spaced apart from the respective leading edge along the downstream direction; wherein each respective OGV of the plurality of OGVs defines a respective OGV camber line that extends between the respective leading edge and the respective trailing edge in a plane that is perpendicular to the respective OGV pivot axis; wherein each respective OGV of the plurality of OGVs has a respective OGV camber line length, as measured along the respective OGV camber line from the respective leading edge to the respective trailing edge; and wherein, for each respective OGV of the plurality of OGVs, a distance from the respective leading edge to a location along the respective OGV camber line that is proximate to the respective OGV pivot axis, as measured along the respective OGV camber line, is at least 0% of the respective OGV camber line length and at most 75% of the respective OGV camber line length.

8. The subsonic turbofan engine of claim 3, wherein each respective OGV of the plurality of OGVs extends between and includes a respective leading edge and a respective trailing edge spaced apart from the respective leading edge along the downstream direction; wherein each respective OGV of the plurality of OGVs includes a respective leading edge region that includes the respective leading edge and a respective trailing edge region that includes the respective trailing edge; and wherein the plurality of OGVs are configured such that, when each respective OGV of the plurality of OGVs transitions among the plurality of OGV configurations, the respective leading edge region pivots about the respective OGV pivot axis and the respective trailing edge region remains stationary relative to the respective OGV pivot axis.

9. The subsonic turbofan engine of claim 8, wherein each respective OGV of the plurality of OGVs defines a respective OGV camber line that extends between the respective leading edge and the respective trailing edge in a plane that is perpendicular to the respective OGV pivot axis; wherein each respective OGV of the plurality of OGVs has a respective OGV camber line length, as measured along the respective OGV camber line from the respective leading edge to the respective trailing edge; and wherein, for each respective OGV of the plurality of OGVs, a distance from the respective leading edge to a location along the respective OGV camber line that is proximate to the respective OGV pivot axis, as measured along the respective OGV camber line, is at least 10% of the respective OGV camber line length and at most 65% of the respective OGV camber line length.

10. The subsonic turbofan engine of claim 8, wherein the respective trailing edge region of each respective OGV of the plurality of OGVs is fixedly coupled to one or both of the inner barrel and the outer barrel.

11. The subsonic turbofan engine of claim 8, wherein the respective trailing edge region of each respective OGV of the plurality of OGVs forms a structural load path between the inner barrel and the outer barrel.

12. The subsonic turbofan engine of claim 8, wherein the respective leading edge region directly engages the respective trailing edge region when the respective OGV is in the nominal configuration.

13. The subsonic turbofan engine of claim 8, wherein the respective leading edge region is spaced apart from the respective trailing edge region when the respective OGV is in the nominal configuration.

14. The subsonic turbofan engine of claim 8, wherein the respective leading edge region directly engages the respective trailing edge region when the respective OGV is in the reduced-drag configuration.

15. The subsonic turbofan engine of claim 8, wherein the respective leading edge region is spaced apart from the respective trailing edge region when the respective OGV is in the reduced-drag configuration.

16. The subsonic turbofan engine of claim 1, wherein each respective OGV of the plurality of OGVs is configured to transition to one or both of the nominal configuration and the reduced-drag configuration at least partially automatically.

17. The subsonic turbofan engine of claim 16, wherein, when the fan is operative to accelerate the air flow through the subsonic turbofan engine during operative use of the subsonic turbofan engine, the air flow exerts a force upon each OGV of the plurality of OGVs to urge each OGV toward the nominal configuration.

18. The subsonic turbofan engine of claim 16, wherein, when the fan is inoperative to accelerate the air flow through the subsonic turbofan engine during operative use of the subsonic turbofan engine, the air flow exerts a force upon each OGV of the plurality of OGVs to urge each OGV toward the reduced-drag configuration.

19. The subsonic turbofan engine of claim 1, further comprising an OGV control system configured to transition each OGV of the plurality of OGVs between the nominal configuration and the reduced-drag configuration.

20. The subsonic turbofan engine of claim 19, wherein each respective OGV of the plurality of OGVs defines a respective OGV pivot axis; wherein each respective OGV of the plurality of OGVs is configured to pivot about the respective OGV pivot axis to transition the respective OGV among the plurality of OGV configurations; wherein each respective OGV of the plurality of OGVs extends between and includes a respective root end positioned proximate to the inner barrel and a respective tip end positioned proximate to the outer barrel; wherein each respective OGV of the plurality of OGVs includes a respective driven end; wherein the OGV control system is configured to exert a pivoting torque on each respective OGV of the plurality of OGVs at the respective driven end to pivot each respective OGV about the respective OGV pivot axis; and wherein the respective root end is the respective driven end.

21. The subsonic turbofan engine of claim 19, wherein each respective OGV of the plurality of OGVs defines a respective OGV pivot axis; wherein each respective OGV of the plurality of OGVs is configured to pivot about the respective OGV pivot axis to transition the respective OGV among the plurality of OGV configurations; wherein each respective OGV of the plurality of OGVs includes a respective driven end; wherein the OGV control system is configured to exert a pivoting torque on each respective OGV of the plurality of OGVs at the respective driven end to pivot each respective OGV about the respective OGV pivot axis; and wherein the OGV control system includes:
 an OGV control ring operatively coupled to the respective driven end of each respective OGV of the plurality of OGVs; and
 an OGV control ring actuator configured to rotate the OGV control ring to transition each OGV of the plurality of OGVs among the plurality of OGV configurations.

22. The subsonic turbofan engine of claim 21, wherein the OGV control ring is operatively coupled to the inner barrel.

23. The subsonic turbofan engine of claim 21, wherein the OGV control ring actuator includes one or more of:
 a control ring bracket operatively coupled to the OGV control ring and configured to rotate the OGV control ring;
 a push rod operatively coupled to the control ring bracket and configured to convey a force to the control ring bracket to rotate the OGV control ring; and
 a crank assembly including a crankshaft operatively coupled to the push rod.

24. The subsonic turbofan engine of claim 19, wherein the OGV control system includes an OGV hold mechanism configured to retain each OGV of the plurality of OGVs in one or both of the nominal configuration or the reduced-drag configuration.

25. The subsonic turbofan engine of claim 24, wherein, while the fan is operable to accelerate the air flow through the subsonic turbofan engine during operative use of the subsonic turbofan engine, the OGV hold mechanism operates to one or both of:
 (i) bias each OGV of the plurality of OGVs toward the nominal configuration; and
 (ii) restrict each OGV of the plurality of OGVs from transitioning away from the nominal configuration.

26. The subsonic turbofan engine of claim 24, wherein, while the fan is inoperable to accelerate the air flow through the subsonic turbofan engine during operative use of the subsonic turbofan engine, the OGV hold mechanism operates to one or both of:
 (i) bias each OGV of the plurality of OGVs toward the reduced-drag configuration; and
 (ii) restrict each OGV of the plurality of OGVs from transitioning away from the reduced-drag configuration.

27. The subsonic turbofan engine of claim 1, wherein one or both of:
 (i) at least a subset of the plurality of pivot stops collectively define the nominal configuration of each OGV of the plurality of OGVs; and
 (ii) at least a subset of the plurality of pivot stops collectively define the reduced-drag configuration of each OGV of the plurality of OGVs.

28. The subsonic turbofan engine of claim 1, wherein one or both of:
 (i) each pivot stop of at least a subset of the plurality of pivot stops is operatively coupled to the inner barrel; and
 (ii) each pivot stop of at least a subset of the plurality of pivot stops is operatively coupled to the outer barrel.

29. The subsonic turbofan engine of claim 19, wherein the OGV control system further includes a controller programmed to selectively transition each OGV of the plurality of OGVs among the plurality of OGV configurations.

30. The subsonic turbofan engine of claim 1, wherein the core structure includes:
 a compressor portion configured to compress an inner air flow, which is a portion of the air flow;
 a combustor portion configured to combust a mixture of the inner air flow and a fuel to generate a propulsive flow mixture; and
 a turbine portion configured to extract energy from the propulsive flow mixture to generate the torque; and
 wherein the subsonic turbofan engine further includes a central shaft configured to convey the torque from the core structure to the fan.

31. The subsonic turbofan engine of claim 30, further comprising a gearbox configured to vary a gear ratio between the central shaft and the fan; and wherein the central shaft is operatively coupled to the fan via the gearbox.

32. The subsonic turbofan engine of claim 1, further comprising a bypass duct extending radially exterior of the inner barrel and radially interior of the outer barrel; wherein the subsonic turbofan engine is configured such that, during operative use of the subsonic turbofan engine, the air flow includes an inner air flow that flows through the engine core and an outer air flow that flows through the bypass duct; and wherein, during operative use of the subsonic turbofan engine, a time-averaged ratio of a mass of air in the outer air flow to a mass of air in the inner air flow is at least 10:1 and at most 60:1.

33. A vehicle comprising the subsonic turbofan engine of claim 1.

34. The vehicle of claim 33, wherein the vehicle is configured to operate only at subsonic speeds.

35. The vehicle of claim 33, wherein the vehicle is an aircraft.

36. A method of operating the subsonic turbofan engine of claim 1, the method comprising:
   transitioning each respective OGV of the plurality of OGVs from the nominal configuration to the reduced-drag configuration;
   wherein the transitioning each OGV from the nominal configuration to the reduced-drag configuration is performed while the subsonic turbofan engine operates at subsonic speeds.

37. The method of claim 36, wherein the transitioning each OGV from the nominal configuration to the reduced-drag configuration is performed responsive to the subsonic turbofan engine transitioning from a thrust-operative state, in which the fan is operative to accelerate the air flow, to a thrust-inoperative state, in which the fan is inoperative to accelerate the air flow.

38. The method of claim 36, further comprising:
   transitioning the fan to a windmilling state in which the fan is free to rotate about the engine longitudinal axis and in which the fan is inoperative to accelerate the air flow.

39. The method of claim 38, wherein the transitioning the fan to the windmilling state is performed responsive to the subsonic turbofan engine transitioning from a thrust-operative state, in which the fan is operative to accelerate the air flow, to a thrust-inoperative state, in which the fan is inoperative to accelerate the air flow.

40. The method of claim 36, wherein the transitioning each OGV from the nominal configuration to the reduced-drag configuration is performed at least partially automatically.

41. The method of claim 36, wherein the transitioning each OGV from the nominal configuration to the reduced-drag configuration is performed at least partially actively.

42. The method of claim 41, wherein each respective OGV of the plurality of OGVs defines a respective OGV pivot axis; wherein each respective OGV of the plurality of OGVs is configured to pivot about the respective OGV pivot axis to transition the respective OGV among the plurality of OGV configurations; wherein the subsonic turbofan engine further includes an OGV control system configured to transition each OGV of the plurality of OGVs between the nominal configuration and the reduced-drag configuration; wherein each respective OGV of the plurality of OGVs includes a respective driven end; wherein the OGV control system is configured to exert a pivoting torque on each respective OGV of the plurality of OGVs at the respective driven end to pivot each respective OGV about the respective OGV pivot axis; wherein the OGV control system includes:
   an OGV control ring operatively coupled to the respective driven end of each respective OGV of the plurality of OGVs; and
   an OGV control ring actuator configured to rotate the OGV control ring to transition each OGV of the plurality of OGVs among a plurality of OGV configurations defined between and including the nominal configuration and the reduced-drag configuration; and
   wherein the transitioning each OGV from the nominal configuration to the reduced-drag configuration includes utilizing one or both of the OGV control system and the OGV control ring actuator.

43. The method of claim 42, wherein the OGV control system further includes a controller programmed to generate an OGV control signal and transmit the OGV control signal to the OGV control ring actuator to selectively transition each OGV of the plurality of OGVs among the plurality of OGV configurations; and wherein the transitioning each OGV from the nominal configuration to the reduced-drag configuration includes transmitting, with the controller, the OGV control signal to the OGV control ring actuator.

44. The method of claim 43, wherein the transmitting the OGV control signal to the OGV control ring actuator is performed responsive to the subsonic turbofan engine transitioning from a thrust-operative state, in which the fan is operative to accelerate the air flow, to a thrust-inoperative state, in which the fan is inoperative to accelerate the air flow.

45. The method of claim 43, wherein the transmitting the OGV control signal to the OGV control ring actuator includes commanding the OGV control ring actuator to rotate the OGV control ring to transition each OGV of the plurality of OGVs to the reduced-drag configuration.

46. The method of claim 42, wherein the OGV control system includes an OGV hold mechanism configured to retain each OGV of the plurality of OGVs in one or both of the nominal configuration or the reduced-drag configuration; and wherein the method further includes, prior to the transitioning each OGV from the nominal configuration to the reduced-drag configuration, disengaging the OGV hold mechanism to permit each OGV of the plurality of OGVs to transition among the plurality of OGV configurations.

47. The method of claim 42, wherein the OGV control system includes an OGV hold mechanism configured to retain each OGV of the plurality of OGVs in one or both of the nominal configuration or the reduced-drag configuration; and wherein the method further includes, subsequent to the transitioning each OGV from the nominal configuration to the reduced-drag configuration, engaging the OGV hold mechanism to restrict each OGV of the plurality of OGVs from transitioning among the plurality of OGV configurations.

* * * * *